(12) United States Patent
Soccorsy et al.

(10) Patent No.: US 12,155,641 B1
(45) Date of Patent: Nov. 26, 2024

(54) NETWORK ACCESS TOKENS AND META-APPLICATION PROGRAMMING INTERFACES FOR ENHANCED INTER-ENTERPRISE SYSTEM DATA PROMULGATION AND PROFILING

(71) Applicant: Wells Fargo Bank, N.A., San Francisco, CA (US)

(72) Inventors: Benjamin Soccorsy, Larkspur, CA (US); Anthony Burton, Charlotte, NC (US); Steven Pulido, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 138 days.

(21) Appl. No.: 17/722,192

(22) Filed: Apr. 15, 2022

(51) Int. Cl.
*H04L 9/40* (2022.01)
*H04L 67/133* (2022.01)

(52) U.S. Cl.
CPC ........ *H04L 63/0807* (2013.01); *H04L 63/102* (2013.01); *H04L 63/108* (2013.01); *H04L 67/133* (2022.05)

(58) Field of Classification Search
CPC . H04L 63/0807; H04L 63/102; H04L 63/108; H04L 67/133
See application file for complete search history.

(56) References Cited

U.S. PATENT DOCUMENTS

| | | |
|---|---|---|
| 2,751,554 A | 6/1956 | Schlesinger et al. |
| 5,485,510 A | 1/1996 | Colbert |
| 5,573,457 A | 11/1996 | Watts et al. |
| 5,737,423 A | 4/1998 | Manduley |
| 5,953,710 A | 9/1999 | Fleming |
| 5,999,978 A | 12/1999 | Angal et al. |
| 6,047,268 A | 4/2000 | Bartoli et al. |
| 6,105,006 A | 8/2000 | Davis et al. |
| 6,188,309 B1 | 2/2001 | Levine |
| 6,193,152 B1 | 2/2001 | Fernando et al. |

(Continued)

FOREIGN PATENT DOCUMENTS

| | | |
|---|---|---|
| AU | 2015255170 A1 | 11/2015 |
| AU | 2016285320 A1 | 1/2017 |

(Continued)

OTHER PUBLICATIONS

NPL Search Terms (Year: 2024).*

(Continued)

*Primary Examiner* — Syed A Zaidi
(74) *Attorney, Agent, or Firm* — Foley & Lardner LLP

(57) ABSTRACT

Methods and systems for retrieving information from secondary computing systems using network access tokens are disclosed. The system can provide a user interface that lists a plurality of secondary computing systems to a client application executing at a client device associated with a user profile of the primary computing system. The system can receive, from the client device, a network token identifying a permission for accessing a second profile maintained at the secondary computing system, and retrieve the subset of data records from the secondary computing system according to a retrieval policy. The system can then update the user interface at the client application to present the subset of data records of the second profile.

20 Claims, 15 Drawing Sheets

(56) References Cited

U.S. PATENT DOCUMENTS

| | | | |
|---|---|---|---|
| 6,408,330 B1 | 6/2002 | Delahuerga |
| 6,422,462 B1 | 7/2002 | Cohen |
| 6,494,367 B1 | 12/2002 | Zacharias |
| 6,575,361 B1 | 6/2003 | Graves et al. |
| 6,717,592 B2 | 4/2004 | Gusler et al. |
| 6,845,906 B2 | 1/2005 | Royer et al. |
| 6,865,547 B1 | 3/2005 | Brake et al. |
| 6,879,965 B2 | 4/2005 | Fung et al. |
| 6,910,021 B2 | 6/2005 | Brown et al. |
| 6,931,382 B2 | 8/2005 | Laage et al. |
| 6,980,969 B1 | 12/2005 | Tuchler et al. |
| 7,014,107 B2 | 3/2006 | Singer et al. |
| 7,016,877 B1 | 3/2006 | Steele et al. |
| 7,107,243 B1 | 9/2006 | Mcdonald et al. |
| 7,155,411 B1 | 12/2006 | Blinn et al. |
| 7,219,833 B2 | 5/2007 | Cantini et al. |
| 7,225,156 B2 | 5/2007 | Fisher et al. |
| 7,249,099 B2 | 7/2007 | Ling |
| 7,264,154 B2 | 9/2007 | Harris |
| 7,319,986 B2 | 1/2008 | Praisner et al. |
| 7,331,518 B2 | 2/2008 | Rable |
| 7,347,361 B2 | 3/2008 | Lovett |
| 7,359,880 B2 | 4/2008 | Abel et al. |
| 7,383,988 B2 | 6/2008 | Slonecker, Jr. |
| 7,383,998 B2 | 6/2008 | Parker et al. |
| 7,392,224 B1 | 6/2008 | Bauer et al. |
| 7,398,248 B2 | 7/2008 | Phillips et al. |
| 7,401,731 B1 | 7/2008 | Pletz et al. |
| 7,413,113 B1 | 8/2008 | Zhu |
| 7,451,395 B2 | 11/2008 | Brants et al. |
| 7,512,563 B2 | 3/2009 | Likourezos et al. |
| 7,552,088 B2 | 6/2009 | Malcolm |
| 7,571,142 B1 | 8/2009 | Flitcroft et al. |
| 7,587,365 B2 | 9/2009 | Malik et al. |
| 7,594,258 B2 * | 9/2009 | Mao ............... H04L 67/306 726/9 |
| 7,653,597 B1 | 1/2010 | Stevanovski et al. |
| 7,685,037 B2 | 3/2010 | Reiners et al. |
| 7,689,502 B2 | 3/2010 | Lilly et al. |
| 7,698,221 B2 | 4/2010 | Blinn et al. |
| 7,707,082 B1 | 4/2010 | Lapstun et al. |
| 7,712,655 B2 | 5/2010 | Wong |
| 7,740,170 B2 | 6/2010 | Singh et al. |
| 7,753,265 B2 | 7/2010 | Harris |
| 7,778,932 B2 | 8/2010 | Yan |
| 7,818,319 B2 | 10/2010 | Henkin et al. |
| 7,857,212 B1 | 12/2010 | Matthews |
| 7,873,573 B2 | 1/2011 | Realini |
| 7,930,228 B1 | 4/2011 | Hawkins et al. |
| 7,937,325 B2 | 5/2011 | Kumar et al. |
| 7,941,534 B2 | 5/2011 | De La Huerga |
| 7,949,572 B2 | 5/2011 | Perrochon et al. |
| 7,954,704 B1 | 6/2011 | Gephart et al. |
| 8,090,346 B2 | 1/2012 | Cai |
| 8,099,109 B2 | 1/2012 | Altman et al. |
| 8,127,982 B1 | 3/2012 | Casey et al. |
| 8,160,933 B2 | 4/2012 | Nguyen et al. |
| 8,175,938 B2 | 5/2012 | Olliphant et al. |
| 8,196,131 B1 | 6/2012 | Von Behren et al. |
| 8,245,909 B2 | 8/2012 | Pletz et al. |
| 8,249,983 B2 | 8/2012 | Dilip et al. |
| 8,255,323 B1 | 8/2012 | Casey et al. |
| 8,266,031 B2 | 9/2012 | Norris et al. |
| 8,266,205 B2 | 9/2012 | Hammad et al. |
| 8,280,786 B1 | 10/2012 | Weiss et al. |
| 8,280,788 B2 | 10/2012 | Perlman |
| 8,296,228 B1 | 10/2012 | Kloor |
| 8,297,502 B1 | 10/2012 | Mcghie et al. |
| 8,301,566 B2 | 10/2012 | Mears |
| 8,332,294 B1 | 12/2012 | Thearling |
| 8,359,531 B2 | 1/2013 | Grandison et al. |
| 8,360,952 B2 | 1/2013 | Wissman et al. |
| 8,364,556 B2 | 1/2013 | Nguyen et al. |
| 8,396,808 B2 | 3/2013 | Greenspan |
| 8,407,136 B2 | 3/2013 | Bard et al. |
| 8,407,142 B1 | 3/2013 | Griggs |
| 8,423,349 B1 | 4/2013 | Huynh et al. |
| 8,473,394 B2 | 6/2013 | Marshall |
| 8,489,761 B2 | 7/2013 | Pope et al. |
| 8,489,894 B2 | 7/2013 | Comrie et al. |
| 8,543,506 B2 | 9/2013 | Grandcolas et al. |
| 8,589,335 B2 | 11/2013 | Smith et al. |
| 8,595,074 B2 | 11/2013 | Sharma et al. |
| 8,595,098 B2 | 11/2013 | Starai et al. |
| 8,625,838 B2 | 1/2014 | Song et al. |
| 8,630,952 B2 | 1/2014 | Menon |
| 8,635,687 B2 | 1/2014 | Binder |
| 8,639,629 B1 | 1/2014 | Hoffman |
| 8,655,310 B1 | 2/2014 | Katzer et al. |
| 8,655,719 B1 | 2/2014 | Li et al. |
| 8,660,926 B1 | 2/2014 | Wehunt et al. |
| 8,666,411 B2 | 3/2014 | Tokgoz et al. |
| 8,682,753 B2 | 3/2014 | Kulathungam |
| 8,682,802 B1 | 3/2014 | Kannanari |
| 8,700,729 B2 | 4/2014 | Dua |
| 8,706,625 B2 | 4/2014 | Vicente et al. |
| 8,712,839 B2 | 4/2014 | Steinert et al. |
| 8,725,601 B2 | 5/2014 | Ledbetter et al. |
| 8,762,211 B2 | 6/2014 | Killian et al. |
| 8,762,237 B2 | 6/2014 | Monasterio et al. |
| 8,768,838 B1 | 7/2014 | Hoffman |
| 8,781,957 B2 | 7/2014 | Jackson et al. |
| 8,781,963 B1 | 7/2014 | Feng et al. |
| 8,793,190 B2 | 7/2014 | Johns et al. |
| 8,794,972 B2 | 8/2014 | Lopucki |
| 8,851,369 B2 | 10/2014 | Bishop et al. |
| 8,868,458 B1 | 10/2014 | Starbuck et al. |
| 8,868,666 B1 | 10/2014 | Hellwege et al. |
| 8,880,047 B2 | 11/2014 | Konicek et al. |
| 8,887,997 B2 | 11/2014 | Barret et al. |
| 8,910,304 B2 | 12/2014 | Tsujimoto |
| 8,924,288 B1 | 12/2014 | Easley et al. |
| 8,925,099 B1 | 12/2014 | Saxe et al. |
| 8,954,839 B2 | 2/2015 | Sharma et al. |
| 9,043,609 B2 * | 5/2015 | Calman ............... G06F 21/33 713/189 |
| 9,076,134 B2 | 7/2015 | Grovit et al. |
| 9,105,021 B2 | 8/2015 | Tobin |
| 9,195,984 B1 | 11/2015 | Spector et al. |
| 9,256,871 B2 | 2/2016 | Anderson et al. |
| 9,256,904 B1 | 2/2016 | Haller et al. |
| 9,305,155 B1 | 4/2016 | Vo et al. |
| 9,351,193 B2 | 5/2016 | Raleigh et al. |
| 9,372,849 B2 | 6/2016 | Gluck et al. |
| 9,390,417 B2 | 7/2016 | Song et al. |
| 9,396,491 B2 | 7/2016 | Isaacson et al. |
| 9,444,824 B1 | 9/2016 | Balazs et al. |
| 9,489,694 B2 | 11/2016 | Haller et al. |
| 9,514,456 B2 | 12/2016 | England et al. |
| 9,519,934 B2 | 12/2016 | Calman et al. |
| 9,524,525 B2 | 12/2016 | Manyam et al. |
| 9,558,478 B2 | 1/2017 | Zhao |
| 9,569,473 B1 | 2/2017 | Holenstein et al. |
| 9,569,766 B2 | 2/2017 | Kneen |
| 9,576,318 B2 | 2/2017 | Caldwell |
| 9,646,300 B1 | 5/2017 | Zhou et al. |
| 9,647,855 B2 | 5/2017 | Deibert et al. |
| 9,690,621 B2 | 6/2017 | Kim et al. |
| 9,699,610 B1 | 7/2017 | Chicoine et al. |
| 9,710,566 B2 | 7/2017 | Ainslie et al. |
| 9,740,543 B1 | 8/2017 | Savage et al. |
| 9,775,029 B2 | 9/2017 | Lopez |
| 9,792,636 B2 | 10/2017 | Milne |
| 9,792,648 B1 | 10/2017 | Haller et al. |
| 9,849,364 B2 | 12/2017 | Tran et al. |
| 9,853,959 B1 | 12/2017 | Kapczynski et al. |
| 9,858,405 B2 | 1/2018 | Ranadive et al. |
| 9,858,576 B2 | 1/2018 | Song et al. |
| 9,978,046 B2 | 5/2018 | Lefebvre et al. |
| 9,996,837 B2 | 6/2018 | Siddens et al. |
| 10,032,146 B2 | 7/2018 | Caldwell |
| 10,044,501 B1 | 8/2018 | Bradley et al. |
| 10,044,647 B1 | 8/2018 | Karp et al. |
| 10,050,779 B2 | 8/2018 | Alness et al. |

(56) References Cited

U.S. PATENT DOCUMENTS

| | | |
|---|---|---|
| 10,055,747 B1 | 8/2018 | Sherman et al. |
| 10,096,006 B2 | 10/2018 | Loevenguth et al. |
| 10,096,043 B2 | 10/2018 | Beck et al. |
| 10,097,356 B2 | 10/2018 | Zinder |
| 10,115,155 B1 | 10/2018 | Haller et al. |
| 10,152,756 B2 | 12/2018 | Isaacson et al. |
| 10,157,420 B2 | 12/2018 | Narayana et al. |
| 10,187,483 B2 | 1/2019 | Golub et al. |
| 10,204,327 B2 | 2/2019 | Katzin et al. |
| 10,216,548 B1 | 2/2019 | Zhang et al. |
| 10,250,453 B1 | 4/2019 | Singh et al. |
| 10,275,602 B2 | 4/2019 | Bjorn et al. |
| 10,282,741 B2 | 5/2019 | Yu et al. |
| 10,359,915 B2 | 7/2019 | Asai |
| 10,373,129 B1 | 8/2019 | James et al. |
| 10,402,817 B1 | 9/2019 | Benkreira et al. |
| 10,402,818 B2 | 9/2019 | Zarakas et al. |
| 10,417,396 B2 | 9/2019 | Bawa et al. |
| 10,423,948 B1 | 9/2019 | Wilson et al. |
| 10,438,290 B1 | 10/2019 | Winklevoss et al. |
| 10,445,152 B1 | 10/2019 | Zhang et al. |
| 10,460,395 B2 | 10/2019 | Grassadonia |
| 10,521,798 B2 | 12/2019 | Song et al. |
| 10,592,882 B1 | 3/2020 | Viswanath et al. |
| 10,614,478 B1 | 4/2020 | Georgi |
| 10,650,448 B1 | 5/2020 | Haller et al. |
| 10,657,503 B1 | 5/2020 | Ebersole et al. |
| 10,673,862 B1 * | 6/2020 | Threlkeld ............... G06F 21/62 |
| 10,742,655 B2 * | 8/2020 | Taylor ................. G06F 21/6209 |
| 10,867,298 B1 | 12/2020 | Duke et al. |
| 10,872,005 B1 | 12/2020 | Killis |
| 10,878,496 B1 | 12/2020 | Duong et al. |
| 10,936,711 B2 * | 3/2021 | Jain ......................... G06F 21/45 |
| 10,963,589 B1 * | 3/2021 | Fakhraie ............... H04L 63/101 |
| 10,984,482 B1 | 4/2021 | Thangarajah et al. |
| 10,992,679 B1 | 4/2021 | Fakhraie et al. |
| 11,107,561 B2 | 8/2021 | Matthieu et al. |
| 11,144,903 B2 | 10/2021 | Ready et al. |
| 11,151,529 B1 | 10/2021 | Nolte et al. |
| 11,200,569 B1 | 12/2021 | James et al. |
| 11,386,223 B1 | 7/2022 | Fakhraie et al. |
| 2001/0001856 A1 | 5/2001 | Gould et al. |
| 2001/0032183 A1 | 10/2001 | Landry |
| 2001/0051920 A1 | 12/2001 | Joao et al. |
| 2001/0056398 A1 | 12/2001 | Scheirer |
| 2002/0016749 A1 | 2/2002 | Borecki et al. |
| 2002/0035539 A1 | 3/2002 | O'Connell |
| 2002/0038289 A1 | 3/2002 | Lawlor et al. |
| 2002/0062249 A1 | 5/2002 | Iannacci |
| 2002/0095386 A1 | 7/2002 | Maritzen et al. |
| 2002/0143655 A1 | 10/2002 | Elston et al. |
| 2002/0169720 A1 | 11/2002 | Wilson et al. |
| 2003/0046246 A1 | 3/2003 | Klumpp et al. |
| 2003/0055786 A1 | 3/2003 | Smith et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0200179 A1 | 10/2003 | Kwan |
| 2003/0216997 A1 | 11/2003 | Cohen |
| 2003/0217001 A1 | 11/2003 | Mcquaide et al. |
| 2004/0054564 A1 | 3/2004 | Fonseca et al. |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0143632 A1 | 7/2004 | Mccarty |
| 2004/0148259 A1 | 7/2004 | Reiners et al. |
| 2004/0178907 A1 | 9/2004 | Cordoba |
| 2004/0225606 A1 | 11/2004 | Nguyen et al. |
| 2004/0249710 A1 | 12/2004 | Smith et al. |
| 2004/0249753 A1 | 12/2004 | Blinn et al. |
| 2004/0263901 A1 | 12/2004 | Critelli et al. |
| 2005/0010483 A1 | 1/2005 | Ling |
| 2005/0014705 A1 | 1/2005 | Cheng et al. |
| 2005/0027431 A1 | 2/2005 | Todoroki et al. |
| 2005/0039041 A1 | 2/2005 | Shaw et al. |
| 2005/0060233 A1 | 3/2005 | Bonalle et al. |
| 2005/0114705 A1 | 5/2005 | Reshef et al. |
| 2005/0131815 A1 | 6/2005 | Fung et al. |
| 2005/0171898 A1 | 8/2005 | Bishop et al. |
| 2005/0199714 A1 | 9/2005 | Brandt et al. |
| 2005/0205662 A1 | 9/2005 | Nelson |
| 2005/0224587 A1 | 10/2005 | Shin et al. |
| 2005/0228750 A1 | 10/2005 | Olliphant et al. |
| 2005/0273431 A1 | 12/2005 | Abel et al. |
| 2006/0046742 A1 | 3/2006 | Zhang |
| 2006/0046745 A1 | 3/2006 | Davidson |
| 2006/0059110 A1 | 3/2006 | Madhok et al. |
| 2006/0178986 A1 | 8/2006 | Giordano et al. |
| 2006/0184456 A1 | 8/2006 | De Janasz |
| 2006/0190374 A1 | 8/2006 | Sher |
| 2006/0202012 A1 | 9/2006 | Grano et al. |
| 2006/0206912 A1 | 9/2006 | Klarfeld et al. |
| 2006/0235795 A1 | 10/2006 | Johnson et al. |
| 2006/0278698 A1 | 12/2006 | Lovett |
| 2007/0051797 A1 | 3/2007 | Randolph-Wall et al. |
| 2007/0083463 A1 | 4/2007 | Kraft |
| 2007/0100773 A1 | 5/2007 | Wallach |
| 2007/0112673 A1 | 5/2007 | Protti |
| 2007/0123305 A1 | 5/2007 | Chen et al. |
| 2007/0143831 A1 | 6/2007 | Pearson et al. |
| 2007/0203836 A1 | 8/2007 | Dodin |
| 2007/0226086 A1 | 9/2007 | Bauman et al. |
| 2007/0255653 A1 | 11/2007 | Tumminaro et al. |
| 2007/0266257 A1 | 11/2007 | Camaisa et al. |
| 2008/0000052 A1 | 1/2008 | Hong et al. |
| 2008/0005037 A1 | 1/2008 | Hammad et al. |
| 2008/0017702 A1 | 1/2008 | Little et al. |
| 2008/0021787 A1 | 1/2008 | Mackouse |
| 2008/0029608 A1 | 2/2008 | Kellum et al. |
| 2008/0052226 A1 | 2/2008 | Agarwal et al. |
| 2008/0066185 A1 | 3/2008 | Lester et al. |
| 2008/0086398 A1 | 4/2008 | Parlotto |
| 2008/0115104 A1 | 5/2008 | Quinn |
| 2008/0149706 A1 | 6/2008 | Brown et al. |
| 2008/0154772 A1 | 6/2008 | Carlson |
| 2008/0170156 A1 | 7/2008 | Kim |
| 2008/0191878 A1 | 8/2008 | Abraham |
| 2008/0208726 A1 | 8/2008 | Tsantes et al. |
| 2008/0226142 A1 | 9/2008 | Pennella et al. |
| 2008/0229383 A1 | 9/2008 | Buss et al. |
| 2008/0244724 A1 | 10/2008 | Choe et al. |
| 2008/0260119 A1 | 10/2008 | Marathe et al. |
| 2008/0283590 A1 | 11/2008 | Oder et al. |
| 2008/0301043 A1 | 12/2008 | Unbehagen |
| 2008/0319889 A1 | 12/2008 | Hammad et al. |
| 2009/0005269 A1 | 1/2009 | Martin et al. |
| 2009/0007231 A1 | 1/2009 | Kaiser et al. |
| 2009/0012898 A1 | 1/2009 | Sharma et al. |
| 2009/0055269 A1 | 2/2009 | Baron |
| 2009/0055642 A1 | 2/2009 | Myers et al. |
| 2009/0089113 A1 | 4/2009 | Rousso et al. |
| 2009/0112763 A1 | 4/2009 | Scipioni et al. |
| 2009/0132351 A1 | 5/2009 | Gibson |
| 2009/0164324 A1 | 6/2009 | Bishop et al. |
| 2009/0205014 A1 | 8/2009 | Doman et al. |
| 2009/0228381 A1 | 9/2009 | Mik et al. |
| 2009/0254447 A1 | 10/2009 | Blades |
| 2009/0254971 A1 | 10/2009 | Herz et al. |
| 2009/0287603 A1 | 11/2009 | Lamar et al. |
| 2009/0319638 A1 | 12/2009 | Faith et al. |
| 2010/0036769 A1 | 2/2010 | Winters et al. |
| 2010/0036906 A1 | 2/2010 | Song et al. |
| 2010/0063906 A1 | 3/2010 | Nelsen et al. |
| 2010/0082445 A1 | 4/2010 | Hodge et al. |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1 | 5/2010 | Duke et al. |
| 2010/0132049 A1 | 5/2010 | Vernal et al. |
| 2010/0199098 A1 | 8/2010 | King |
| 2010/0228671 A1 | 9/2010 | Patterson |

(56) References Cited

U.S. PATENT DOCUMENTS

| | | |
|---|---|---|
| 2010/0274691 A1 | 10/2010 | Hammad et al. |
| 2010/0276484 A1 | 11/2010 | Banerjee et al. |
| 2010/0312700 A1 | 12/2010 | Coulter et al. |
| 2010/0327056 A1 | 12/2010 | Yoshikawa et al. |
| 2011/0023129 A1 | 1/2011 | Vernal et al. |
| 2011/0035288 A1 | 2/2011 | Clyne |
| 2011/0035318 A1 | 2/2011 | Hargrove et al. |
| 2011/0035596 A1 | 2/2011 | Attia et al. |
| 2011/0078010 A1 | 3/2011 | Postrel |
| 2011/0106698 A1 | 5/2011 | Isaacson et al. |
| 2011/0162057 A1 | 6/2011 | Gottumukkala et al. |
| 2011/0172837 A1 | 7/2011 | Forbes, Jr. |
| 2011/0176010 A1 | 7/2011 | Houjou et al. |
| 2011/0178929 A1 | 7/2011 | Durkin et al. |
| 2011/0191177 A1 | 8/2011 | Blackhurst et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0247055 A1 | 10/2011 | Guo et al. |
| 2011/0276479 A1 | 11/2011 | Thomas |
| 2011/0307826 A1 | 12/2011 | Rivera et al. |
| 2011/0320246 A1 | 12/2011 | Tietzen et al. |
| 2012/0024946 A1 | 2/2012 | Tullis et al. |
| 2012/0030006 A1 | 2/2012 | Yoder et al. |
| 2012/0030109 A1 | 2/2012 | Dooley Maley et al. |
| 2012/0041881 A1 | 2/2012 | Basu et al. |
| 2012/0046994 A1 | 2/2012 | Reisman |
| 2012/0047072 A1 | 2/2012 | Larkin |
| 2012/0096534 A1 | 4/2012 | Boulos et al. |
| 2012/0099780 A1 | 4/2012 | Smith et al. |
| 2012/0101938 A1 | 4/2012 | Kasower |
| 2012/0117467 A1 | 5/2012 | Maloney et al. |
| 2012/0117476 A1 | 5/2012 | Siegrist et al. |
| 2012/0123841 A1 | 5/2012 | Taveau et al. |
| 2012/0123933 A1 | 5/2012 | Abel et al. |
| 2012/0124658 A1 | 5/2012 | Brudnicki et al. |
| 2012/0158590 A1 | 6/2012 | Salonen |
| 2012/0173387 A1 | 7/2012 | Talker et al. |
| 2012/0197691 A1 | 8/2012 | Grigg et al. |
| 2012/0214577 A1 | 8/2012 | Petersen et al. |
| 2012/0227094 A1 | 9/2012 | Begen et al. |
| 2012/0239417 A1 | 9/2012 | Pourfallah et al. |
| 2012/0239479 A1 | 9/2012 | Amaro et al. |
| 2012/0239670 A1 | 9/2012 | Horn et al. |
| 2012/0240235 A1 | 9/2012 | Moore |
| 2012/0246122 A1 | 9/2012 | Short et al. |
| 2012/0254038 A1 | 10/2012 | Mullen |
| 2012/0259782 A1 | 10/2012 | Hammad |
| 2012/0265682 A1 | 10/2012 | Menon |
| 2012/0265685 A1 | 10/2012 | Brudnicki et al. |
| 2012/0270522 A1 | 10/2012 | Laudermilch et al. |
| 2012/0296725 A1 | 11/2012 | Dessert et al. |
| 2012/0296831 A1 | 11/2012 | Carrott |
| 2012/0310760 A1 | 12/2012 | Phillips et al. |
| 2012/0317036 A1 | 12/2012 | Bower et al. |
| 2013/0006847 A1 | 1/2013 | Hammad et al. |
| 2013/0031006 A1 | 1/2013 | Mccullagh et al. |
| 2013/0046607 A1 | 2/2013 | Granville, III |
| 2013/0046690 A1 | 2/2013 | Calman et al. |
| 2013/0055378 A1 | 2/2013 | Chang et al. |
| 2013/0080219 A1 | 3/2013 | Royyuru et al. |
| 2013/0090998 A1 | 4/2013 | Shimogori |
| 2013/0091452 A1 | 4/2013 | Sorden et al. |
| 2013/0103391 A1 | 4/2013 | Millmore et al. |
| 2013/0117696 A1 | 5/2013 | Robertson et al. |
| 2013/0132854 A1 | 5/2013 | Raleigh et al. |
| 2013/0151405 A1 | 6/2013 | Head et al. |
| 2013/0173402 A1 | 7/2013 | Young et al. |
| 2013/0174244 A1 | 7/2013 | Taveau et al. |
| 2013/0191213 A1 | 7/2013 | Beck et al. |
| 2013/0204894 A1 | 8/2013 | Faith |
| 2013/0212666 A1 | 8/2013 | Mattsson et al. |
| 2013/0218649 A1 | 8/2013 | Beal |
| 2013/0218758 A1 | 8/2013 | Koenigsbrueck et al. |
| 2013/0226813 A1 | 8/2013 | Voltz |
| 2013/0240618 A1 | 9/2013 | Hall |
| 2013/0246258 A1 | 9/2013 | Dessert |
| 2013/0246272 A1 | 9/2013 | Kirsch |
| 2013/0254079 A1 | 9/2013 | Murali |
| 2013/0254115 A1 | 9/2013 | Pasa et al. |
| 2013/0282542 A1 | 10/2013 | White |
| 2013/0301392 A1 | 11/2013 | Zhao |
| 2013/0317893 A1 | 11/2013 | Nelson et al. |
| 2013/0332256 A1 | 12/2013 | Faith et al. |
| 2013/0339124 A1 | 12/2013 | Postrel |
| 2013/0346302 A1 | 12/2013 | Purves et al. |
| 2013/0346306 A1 | 12/2013 | Kopp |
| 2013/0346310 A1 | 12/2013 | Burger et al. |
| 2014/0006209 A1 | 1/2014 | Groarke |
| 2014/0019352 A1 | 1/2014 | Shrivastava |
| 2014/0024354 A1 | 1/2014 | Haik et al. |
| 2014/0026193 A1 | 1/2014 | Saxman et al. |
| 2014/0032410 A1 | 1/2014 | Georgiev et al. |
| 2014/0032419 A1 | 1/2014 | Anderson et al. |
| 2014/0032723 A1 | 1/2014 | Nema |
| 2014/0040134 A1 | 2/2014 | Ciurea |
| 2014/0040144 A1 | 2/2014 | Plomske et al. |
| 2014/0046827 A1 | 2/2014 | Hochstatter et al. |
| 2014/0053069 A1 | 2/2014 | Yan |
| 2014/0058912 A1 | 2/2014 | Bajaj |
| 2014/0067503 A1 | 3/2014 | Ebarle Grecsek et al. |
| 2014/0067683 A1 | 3/2014 | Varadarajan |
| 2014/0068030 A1 | 3/2014 | Chambers et al. |
| 2014/0076967 A1 | 3/2014 | Pushkin et al. |
| 2014/0081736 A1 | 3/2014 | Blackhurst et al. |
| 2014/0108140 A1 | 4/2014 | Crawford |
| 2014/0108260 A1 | 4/2014 | Poole et al. |
| 2014/0108263 A1 | 4/2014 | Ortiz et al. |
| 2014/0114780 A1 | 4/2014 | Menefee et al. |
| 2014/0114855 A1 | 4/2014 | Bajaj et al. |
| 2014/0122328 A1 | 5/2014 | Grigg |
| 2014/0123312 A1 | 5/2014 | Marcotte |
| 2014/0129357 A1 | 5/2014 | Goodwin |
| 2014/0129448 A1 | 5/2014 | Aiglstorfer |
| 2014/0136419 A1 | 5/2014 | Kiyohara |
| 2014/0143886 A1 | 5/2014 | Eversoll et al. |
| 2014/0149198 A1 | 5/2014 | Kim et al. |
| 2014/0149368 A1 | 5/2014 | Lee et al. |
| 2014/0162598 A1 | 6/2014 | Villa-Real |
| 2014/0164220 A1 | 6/2014 | Desai et al. |
| 2014/0172576 A1 | 6/2014 | Spears et al. |
| 2014/0172707 A1 | 6/2014 | Kuntagod et al. |
| 2014/0180854 A1 | 6/2014 | Bryant, II |
| 2014/0198054 A1 | 7/2014 | Sharma et al. |
| 2014/0200957 A1 | 7/2014 | Biggs |
| 2014/0207672 A1 | 7/2014 | Kelley |
| 2014/0236792 A1 | 8/2014 | Pant et al. |
| 2014/0237236 A1 | 8/2014 | Kalinichenko et al. |
| 2014/0248852 A1 | 9/2014 | Raleigh et al. |
| 2014/0250002 A1 | 9/2014 | Isaacson et al. |
| 2014/0258104 A1 | 9/2014 | Harnisch |
| 2014/0258109 A1 | 9/2014 | Jiang et al. |
| 2014/0258110 A1 | 9/2014 | Davis et al. |
| 2014/0279309 A1 | 9/2014 | Cowen et al. |
| 2014/0279474 A1 | 9/2014 | Evans et al. |
| 2014/0279551 A1 | 9/2014 | Samid |
| 2014/0279559 A1 | 9/2014 | Smith et al. |
| 2014/0282852 A1 | 9/2014 | Vestevich |
| 2014/0297438 A1 | 10/2014 | Dua |
| 2014/0306833 A1 | 10/2014 | Ricci |
| 2014/0324527 A1 | 10/2014 | Kulkarni et al. |
| 2014/0337188 A1 | 11/2014 | Bennett et al. |
| 2014/0337215 A1 | 11/2014 | Howe |
| 2014/0344149 A1 | 11/2014 | Campos |
| 2014/0344153 A1 | 11/2014 | Raj et al. |
| 2014/0344877 A1 | 11/2014 | Ohmata et al. |
| 2014/0357233 A1 | 12/2014 | Maximo et al. |
| 2014/0365291 A1 | 12/2014 | Shvarts |
| 2014/0372308 A1 | 12/2014 | Sheets |
| 2014/0379575 A1 | 12/2014 | Rogan |
| 2015/0019443 A1 | 1/2015 | Sheets et al. |
| 2015/0019944 A1 | 1/2015 | Kalgi |
| 2015/0026026 A1 | 1/2015 | Calman et al. |

(56) References Cited

U.S. PATENT DOCUMENTS

| | | |
|---|---|---|
| 2015/0026049 A1 | 1/2015 | Theurer et al. |
| 2015/0026057 A1 | 1/2015 | Calman et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0039457 A1 | 2/2015 | Jacobs et al. |
| 2015/0039496 A1 | 2/2015 | Shuster |
| 2015/0046338 A1 | 2/2015 | Laxminarayanan et al. |
| 2015/0046339 A1 | 2/2015 | Wong et al. |
| 2015/0066768 A1 | 3/2015 | Williamson et al. |
| 2015/0070132 A1 | 3/2015 | Candelore |
| 2015/0073989 A1 | 3/2015 | Green et al. |
| 2015/0079932 A1 | 3/2015 | Zelinka et al. |
| 2015/0081349 A1 | 3/2015 | Johndrow et al. |
| 2015/0082042 A1 | 3/2015 | Hoornaert et al. |
| 2015/0088633 A1 | 3/2015 | Salmon et al. |
| 2015/0088756 A1 | 3/2015 | Makhotin et al. |
| 2015/0095238 A1 | 4/2015 | Khan et al. |
| 2015/0095999 A1 | 4/2015 | Toth |
| 2015/0096039 A1 | 4/2015 | Mattsson et al. |
| 2015/0100477 A1 | 4/2015 | Salama et al. |
| 2015/0100495 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0127524 A1 | 5/2015 | Jacobs et al. |
| 2015/0127547 A1 | 5/2015 | Powell et al. |
| 2015/0128215 A1 | 5/2015 | Son et al. |
| 2015/0132984 A1 | 5/2015 | Kim et al. |
| 2015/0134700 A1 | 5/2015 | Macklem et al. |
| 2015/0142673 A1 | 5/2015 | Nelsen et al. |
| 2015/0149272 A1 | 5/2015 | Salmon et al. |
| 2015/0149357 A1 | 5/2015 | Ioannidis et al. |
| 2015/0154595 A1 | 6/2015 | Collinge et al. |
| 2015/0178724 A1 | 6/2015 | Ngo et al. |
| 2015/0180836 A1 | 6/2015 | Wong et al. |
| 2015/0186856 A1 | 7/2015 | Weiss et al. |
| 2015/0193639 A1 | 7/2015 | Esposito et al. |
| 2015/0193764 A1 | 7/2015 | Haggerty et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0200495 A1 | 7/2015 | Yu et al. |
| 2015/0213435 A1 | 7/2015 | Douglas et al. |
| 2015/0220917 A1 | 8/2015 | Aabye et al. |
| 2015/0220999 A1 | 8/2015 | Thornton et al. |
| 2015/0221149 A1 | 8/2015 | Main et al. |
| 2015/0229622 A1 | 8/2015 | Grigg et al. |
| 2015/0242853 A1 | 8/2015 | Powell |
| 2015/0248405 A1 | 9/2015 | Rudich et al. |
| 2015/0254635 A1 | 9/2015 | Bondesen et al. |
| 2015/0254638 A1 | 9/2015 | Bondesen et al. |
| 2015/0254646 A1 | 9/2015 | Harkey et al. |
| 2015/0254647 A1 | 9/2015 | Bondesen et al. |
| 2015/0254655 A1 | 9/2015 | Bondesen et al. |
| 2015/0254656 A1 | 9/2015 | Bondesen et al. |
| 2015/0269566 A1 | 9/2015 | Gaddam et al. |
| 2015/0277712 A1 | 10/2015 | Ratcliffe et al. |
| 2015/0286834 A1 | 10/2015 | Ohtani et al. |
| 2015/0287133 A1 | 10/2015 | Marlov et al. |
| 2015/0295906 A1 | 10/2015 | Ufford et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0324592 A1 | 11/2015 | Dutta |
| 2015/0332067 A1 | 11/2015 | Gorod |
| 2015/0339663 A1 | 11/2015 | Lopreiato et al. |
| 2015/0339664 A1 | 11/2015 | Wong et al. |
| 2015/0348083 A1 | 12/2015 | Brill et al. |
| 2015/0371221 A1 | 12/2015 | Wardman |
| 2015/0372999 A1 | 12/2015 | Pi-Sunyer |
| 2015/0379508 A1 | 12/2015 | Van |
| 2016/0004741 A1 | 1/2016 | Johnson et al. |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0036790 A1 | 2/2016 | Shastry et al. |
| 2016/0042381 A1 | 2/2016 | Braine et al. |
| 2016/0063497 A1 | 3/2016 | Grant, IV |
| 2016/0065370 A1 | 3/2016 | Le Saint et al. |
| 2016/0078428 A1 | 3/2016 | Moser et al. |
| 2016/0080403 A1 | 3/2016 | Cunningham et al. |
| 2016/0086222 A1 | 3/2016 | Kurapati |
| 2016/0092696 A1 | 3/2016 | Guglani et al. |
| 2016/0092870 A1 | 3/2016 | Salama et al. |
| 2016/0092872 A1 | 3/2016 | Prakash et al. |
| 2016/0092874 A1 | 3/2016 | O'Regan et al. |
| 2016/0098577 A1 | 4/2016 | Lacey et al. |
| 2016/0098692 A1 | 4/2016 | Johnson et al. |
| 2016/0109954 A1 | 4/2016 | Harris et al. |
| 2016/0119296 A1 | 4/2016 | Laxminarayanan et al. |
| 2016/0125405 A1 | 5/2016 | Alterman et al. |
| 2016/0125409 A1 | 5/2016 | Meredith et al. |
| 2016/0127892 A1 | 5/2016 | Huang et al. |
| 2016/0132918 A1 | 5/2016 | Thomas |
| 2016/0140221 A1 | 5/2016 | Park et al. |
| 2016/0140541 A1 | 5/2016 | Pearson et al. |
| 2016/0149875 A1 | 5/2016 | Li et al. |
| 2016/0155156 A1 | 6/2016 | Gopal et al. |
| 2016/0171483 A1 | 6/2016 | Luoma et al. |
| 2016/0173483 A1 | 6/2016 | Wong et al. |
| 2016/0180302 A1 | 6/2016 | Bagot, Jr. |
| 2016/0189121 A1 | 6/2016 | Best et al. |
| 2016/0217461 A1 | 7/2016 | Gaddam et al. |
| 2016/0232600 A1 | 8/2016 | Purves |
| 2016/0239437 A1 | 8/2016 | Le et al. |
| 2016/0239835 A1 | 8/2016 | Marsyla |
| 2016/0239840 A1 | 8/2016 | Preibisch |
| 2016/0260084 A1 | 9/2016 | Main et al. |
| 2016/0260176 A1 | 9/2016 | Bernard et al. |
| 2016/0267467 A1 | 9/2016 | Rutherford et al. |
| 2016/0267480 A1 | 9/2016 | Metral |
| 2016/0292673 A1 | 10/2016 | Chandrasekaran |
| 2016/0294879 A1 | 10/2016 | Kirsch |
| 2016/0307229 A1 | 10/2016 | Balasubramanian et al. |
| 2016/0314458 A1 | 10/2016 | Douglas et al. |
| 2016/0321669 A1 | 11/2016 | Beck et al. |
| 2016/0328522 A1 | 11/2016 | Howley |
| 2016/0328577 A1 | 11/2016 | Howley |
| 2016/0358163 A1 | 12/2016 | Kumar et al. |
| 2016/0371471 A1 | 12/2016 | Patton et al. |
| 2016/0373458 A1 | 12/2016 | Moreton et al. |
| 2016/0379211 A1 | 12/2016 | Hoyos et al. |
| 2017/0004506 A1 | 1/2017 | Steinman et al. |
| 2017/0004590 A1 | 1/2017 | Gluhovsky |
| 2017/0011215 A1 | 1/2017 | Poiesz et al. |
| 2017/0011389 A1 | 1/2017 | Mccandless et al. |
| 2017/0011450 A1 | 1/2017 | Frager et al. |
| 2017/0018029 A1 | 1/2017 | Eiriz et al. |
| 2017/0024393 A1 | 1/2017 | Choksi et al. |
| 2017/0068954 A1 | 3/2017 | Hockey et al. |
| 2017/0070484 A1 | 3/2017 | Kruse et al. |
| 2017/0078299 A1 | 3/2017 | Castinado et al. |
| 2017/0078303 A1 | 3/2017 | Wu |
| 2017/0091759 A1 | 3/2017 | Selfridge et al. |
| 2017/0132633 A1 | 5/2017 | Whitehouse |
| 2017/0147631 A1 | 5/2017 | Nair et al. |
| 2017/0161724 A1 | 6/2017 | Lau |
| 2017/0161973 A1* | 6/2017 | Katta ............... G06Q 40/08 |
| 2017/0237554 A1 | 8/2017 | Jacobs et al. |
| 2017/0249478 A1 | 8/2017 | Lovin |
| 2017/0344991 A1 | 11/2017 | Mark et al. |
| 2017/0352028 A1 | 12/2017 | Vridhachalam et al. |
| 2017/0364898 A1 | 12/2017 | Ach et al. |
| 2017/0366348 A1 | 12/2017 | Weimer |
| 2018/0005323 A1 | 1/2018 | Grassadonia |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0075440 A1 | 3/2018 | Beck et al. |
| 2018/0088909 A1 | 3/2018 | Baratta et al. |
| 2018/0096752 A1 | 4/2018 | Ovalle |
| 2018/0121913 A1 | 5/2018 | Unnerstall et al. |
| 2018/0158137 A1 | 6/2018 | Tsantes et al. |

(56) References Cited

U.S. PATENT DOCUMENTS

| | | |
|---|---|---|
| 2018/0174148 A1 | 6/2018 | Selvarajan |
| 2018/0247302 A1 | 8/2018 | Armstrong et al. |
| 2018/0254898 A1 | 9/2018 | Sprague et al. |
| 2018/0268382 A1 | 9/2018 | Wasserman |
| 2018/0270363 A1 | 9/2018 | Guday et al. |
| 2018/0276628 A1 | 9/2018 | Radiotis et al. |
| 2018/0293554 A1 | 10/2018 | Johnson |
| 2018/0331835 A1 | 11/2018 | Jackson |
| 2018/0349922 A1 | 12/2018 | Carlson et al. |
| 2018/0357440 A1 | 12/2018 | Brady et al. |
| 2018/0373891 A1 | 12/2018 | Barday et al. |
| 2019/0007381 A1 | 1/2019 | Isaacson et al. |
| 2019/0095898 A1 | 3/2019 | Bhatia |
| 2019/0164221 A1 | 5/2019 | Hill et al. |
| 2019/0171831 A1 | 6/2019 | Xin |
| 2019/0197501 A1 | 6/2019 | Senci et al. |
| 2019/0220834 A1 | 7/2019 | Moshal et al. |
| 2019/0228173 A1 | 7/2019 | Gupta et al. |
| 2019/0228428 A1 | 7/2019 | Bruner et al. |
| 2019/0228430 A1 | 7/2019 | Givol et al. |
| 2019/0244214 A1 | 8/2019 | Flores et al. |
| 2019/0295069 A1 | 9/2019 | Pala et al. |
| 2019/0318122 A1 | 10/2019 | Hockey et al. |
| 2019/0318424 A1 | 10/2019 | Mcwilliams |
| 2019/0325161 A1 | 10/2019 | Zavesky et al. |
| 2019/0332802 A1 | 10/2019 | Barday et al. |
| 2019/0333061 A1 | 10/2019 | Jackson et al. |
| 2019/0347442 A1 | 11/2019 | Marlin et al. |
| 2019/0354979 A1 | 11/2019 | Crawford |
| 2019/0356641 A1 | 11/2019 | Isaacson et al. |
| 2019/0362069 A1 | 11/2019 | Park et al. |
| 2019/0369845 A1 | 12/2019 | Rucker |
| 2019/0370798 A1 | 12/2019 | Hu et al. |
| 2019/0378182 A1 | 12/2019 | Weinflash et al. |
| 2019/0392443 A1 | 12/2019 | Piparsaniya et al. |
| 2020/0005283 A1 | 1/2020 | Zimmerman et al. |
| 2020/0005347 A1 | 1/2020 | Boal |
| 2020/0074552 A1 | 3/2020 | Shier et al. |
| 2020/0076601 A1* | 3/2020 | Tabrizi .................. H04L 9/0637 |
| 2020/0090179 A1 | 3/2020 | Song et al. |
| 2020/0118114 A1 | 4/2020 | Benkreira et al. |
| 2020/0118132 A1 | 4/2020 | Schmidt et al. |
| 2020/0118133 A1 | 4/2020 | Schmidt et al. |
| 2020/0286057 A1 | 9/2020 | Desai |
| 2020/0286076 A1 | 9/2020 | Zhu et al. |
| 2020/0380514 A1 | 12/2020 | Crofts |
| 2021/0012326 A1 | 1/2021 | Maxwell Zelocchi |
| 2021/0027300 A1 | 1/2021 | Chetia et al. |
| 2021/0035072 A1 | 2/2021 | Awasthi |
| 2021/0124760 A1 | 4/2021 | Klein et al. |
| 2021/0217002 A1 | 7/2021 | Basu et al. |
| 2021/0233170 A1 | 7/2021 | Cadet |
| 2021/0258169 A1 | 8/2021 | Basu et al. |
| 2021/0303335 A1 | 9/2021 | Foreman et al. |
| 2021/0350343 A1 | 11/2021 | Gaur et al. |
| 2021/0350458 A1 | 11/2021 | Gaur et al. |
| 2022/0029815 A1 | 1/2022 | Basu et al. |
| 2022/0292496 A1 | 9/2022 | Yan |
| 2022/0294630 A1 | 9/2022 | Collen |
| 2023/0036439 A1 | 2/2023 | Olson et al. |
| 2023/0070625 A1 | 3/2023 | Gaur et al. |
| 2023/0206329 A1 | 6/2023 | Cella et al. |
| 2023/0214925 A1 | 7/2023 | Cella et al. |
| 2024/0265405 A1 | 8/2024 | Kramme et al. |

FOREIGN PATENT DOCUMENTS

| | | |
|---|---|---|
| CA | 2369296 A1 | 10/2000 |
| CA | 2751554 A1 | 8/2010 |
| CN | 102498497 A | 6/2012 |
| CN | 102804219 A | 11/2012 |
| CN | 104106276 B | 10/2014 |
| CN | 107230049 A | 10/2017 |
| CN | 107230070 A | 10/2017 |
| CN | 103413231 B | 11/2017 |
| EP | 1 259 947 A2 | 11/2002 |
| EP | 1 770 628 A2 | 4/2007 |
| EP | 3 073 670 B1 | 9/2016 |
| GB | 0 441 156 A | 1/1936 |
| GB | 2 441 156 A | 2/2008 |
| KR | 20160015375 A | 2/2016 |
| WO | WO-90/13096 A1 | 11/1990 |
| WO | WO-00/72245 A1 | 11/2000 |
| WO | WO-03/038551 A2 | 5/2003 |
| WO | WO-2004/081893 A1 | 9/2004 |
| WO | WO-2004/090825 A1 | 10/2004 |
| WO | WO-2009/151839 A1 | 12/2009 |
| WO | WO-2011/017613 A2 | 2/2011 |
| WO | WO-2011/053404 A1 | 5/2011 |
| WO | WO-2012/054148 A1 | 4/2012 |
| WO | WO-2012/150602 A1 | 11/2012 |
| WO | WO-2013/075071 A1 | 5/2013 |
| WO | WO-2013/082190 A1 | 6/2013 |
| WO | WO-2015/103443 A1 | 7/2015 |
| WO | WO-2015/135131 A1 | 9/2015 |
| WO | WO-2016/015054 A1 | 1/2016 |
| WO | WO-2016/025291 A1 | 2/2016 |
| WO | WO-2017/035399 A1 | 3/2017 |
| WO | WO-2018/005635 A1 | 1/2018 |
| WO | WO-2022/154789 A1 | 7/2022 |

OTHER PUBLICATIONS

Hinze et al.; Event-Based Applications and Enabling Technologies. https://www.researchgate.net/profile/Annika-Hinze/publication/220796268_Event-based_applications_and_enabling_technologies/Links/0fcfd50b638d9592a1000000/Event-based-applications-and-enabling-technologies.pdf (Year: 2009).

Technologies for Payment Fraud Prevention: EMV, Encryption, and Tokenization, Oct. 2014, Smart Card Alliance, pp. 1-34 (Year: 2014).

Yang, Ming-Hour; Security Enhanced EMV-Based Mobile Payment Protocol. https://patents.google.com/scholar/15767854982483958498?q (Security Enhanced EMV-Based Mobile Payment Protocol)&patents=false&scholar&oq=Security Enhanced EMV-Based Mobile Payment Protocol (Year: 2014).

Diversinet enables new consumer mobile services from intersections inc.; MobiSecure wallet and vault helps identity management leader get closer to its customers. (May 30, 2007). PR Newswire Retrieved from https://dialog.proquest.com/professional/docview/450976918?accountid=131444 on Feb. 22, 2023 (Year: 2007).

Eickhoff et al: "Quality through Flow and Immersion: Gamifying Crowdsourced Relevance Assessments", Proceedings of the 35th international ACM SIGIR conference on Research and development in information retrieval, Aug. 12, 2012. (Year: 2012).

Asb, "How to command your cards with ASB Card Control" Apr. 20, 2015, https://www.youtube.com/watch?v=O1sfxvVUL74 (Year: 2015).

Austin Telco Federal Credit Union, "Lost or Stolen Cards", www.atfcu.org/lost-stolen-cards.htm; Apr. 9, 2004. 6 pages.

Authorize.Net. Authorize.Net Mobile Application: iOS User Guide. Sep. 2015. Authorize.Net LLC. Ver.2.0, 1-23. https://www.authorize.net/content/dam/anet-redesign/documents/iosuserguide.pdf (Year: 2015).

Bancfirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

CO-OP THINK, Rachna Ahlawat at CO-OP THINK—Evolution Sessions from THINK14, Dec. 22, 2014, 26:22. https://www.youtube.com/watch?v=yEp-qfZoPhI (Year: 2014).

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

Demiriz et al. "Using Location Aware Business Rules for Preventing Retail Banking Frauds" Jan. 15, 2015, IEEE (Year: 2015).

(56) References Cited

OTHER PUBLICATIONS

Fiserv. CardValet: Mobile Application Training. Fiserv, Inc. 1-93. https://www.westernbanks.com/media/1664/ cardvalet-application .pdf (Year: 2015).

Fort Knox Federal Credit Union, "Lost or Stolen VISA Card", http://www.fortknoxfcu.org/loststolen.html, Feb. 1, 2001. 2 pages.

IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).

IP.com Search Query; May 5, 2020 (Year: 2020).

KONSKO: "Credit Card Tokenization: Here's What You Need to Know", Credit Card Basics, Credit Card—Advertisement Nerdwallet (Year: 2014).

Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.

Microsoft, "Automatically summarize a document", 2016. 3 pages.

Notre Dame FCU "Irish Card Shield: How to Control Transaction Types" Jan. 15, 2016, 0:27, https://youtube.com/watch?v=0eZG1c6Bn38 (Year: 2016).

PCM Credit Union, "CardValet Tutorial" Jun. 24, 2015, https://www.youtube.com/watch?v=uGPh9Htw0Wc (Year: 2015).

Purchasing charges ahead. (1994). Electronic Buyers' News,, 68. Retrieved from https://dialog.proquest.com/professional/docview/681599288?accountid=131444 on Nov. 13, 2020 (Year: 1994).

RBC Royal Bank, "If Your Card is Lost or Stolen", http://www.rblbank.com/pdfs/CreditCard/FAQs.pdf, Oct. 1, 2002. 2 pages.

Smartphones as Practical and Secure Location Verification Tokens for Payments. file:///C:/Users/eoussir/Documents/e-Red% 20 Folder/15496961 /N PL_ Smartphones %20as %20 Practical %20and %20Secu re %20 Location %20Verification %20Tokens %20for% 20Payments.pdf (Year: 2014).

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

Transaction aggregation as a strategy for credit card fraud detection. file:///C:/Users/eoussir/Downloads/ Transaction_aggregation_as_a_strategy for credit_c. pdf (Year: 2009).

Union Bank & Trust, "Report Lost or Stolen Card", http://www.ubt.com/security-fraud/report-lost-or-stolen-cards, Jul. 10, 2005. 13 pages.

Urein et al: "A breakthrough for prepaid payment: End to end token exchange and management using secure SSL channels created by EAP-TLS smart cards", 2011 International Conference on Collaboration Technologies and Systems (CTS) (Year: 2011).

Using location aware business rules for preventing retail banking frauds. https://ieeexplore.ieee.org/stamp/stamp.jsp?tp=&arnumber=7351936 (Year: 2015).

Yang MH. Security enhanced EMV-based mobile payment protocol. Scientific World Journal. 2014.https://www.ncbi.nlm.nih.gov/ pmc/articles/PMC4181509/ (Year: 2014).

Foreign Action other than Search Report on non-Foley case related to US Dtd Dec. 7, 2022.

"Bitcoin Off-Chain Transactions: Their Invention and Use," by Michelle Mount. Geo. L. Tech. Rev. 4. 2020. pp. 685-698. (Year: 2020).

"The Bitcoin Lightening Network: Scalable Off-Chain Instant Payments," by Joseph Poon; and Thaddeus Dryia. Jan. 14, 2016. (Year: 2016).

Are Central Bank Digital Currencies (CBDCs) the money of tomorrow (Year: 2020).

Shehnaz Ahmed, Private partners could help RBI run a digital currency. (Year: 2021).

Shiravale, et al., Blockchain Technology: A Novel Approach in Information Security Research, IEEE 2018 (Year: 2018), 4 pps.

Yang, et al., Impact of Bitcoin's Distributed Structure on the Construction of the Central Bank's Digital Currency System IEEE, 2020 (Year: 2020), 4 pps.

Other USPTO Comm. with Refs. on US Dtd Nov. 22, 2023.

Luz et al.: "A Mobile NFC Payment Terminal for the Event-Wallet on an Android Smartphone" researchgat.net, (Year: 2012).

Tene et al. Big Data for All: Privacy and User Control in the Age of Analytics. Northwestern Journal of technology and Intellectual Property. https://scholarlycommons.law.northwestern.edu/cgi/viewcontent.cgi?article= 1191 &context=njtip (Year: 2013).

Demiriz et al., "Using location aware business rules for preventing retail banking frauds," 2015 First International Conference on Anti-Cybercrime (ICACC), pp. 1-6. https://ieeexplore.IEEE.org/documenU7351936? source=IQplus.

Dunman et al., "A Novel and Successful Credit Card Fraud Detection System Implemented in a Turkish Bank," 2013 IEEE 13th International Conference on Data Mining Workshops, Dallas, TX, USA. Retrieved from https://ieeexplore.IEEE.org/documenU6753916? source=IQplus.

Ivatury, G., Mobile Phone Banking and Low-Income Customers, 2006, Retrieved from https://www.cgap.org/sites/default/files/CGAP-Mobile-Phone-Banking-and-Low-Income-Customers-Evidence-from-South-Africa-Jan. 2006.pdf.

Park et al., "Leveraging Cellular Infrastructure to Improve Fraud Prevention," 2009 Annual Computer Security Applications Conference, Honolulu, HI, USA, https://ieeexplore.IEEE.org/documenU5380689?source= IQplus.

Trappey et al., "Patent portfolio analysis of e-payment services using technical ontology roadmaps," 2016 IEEE International Conference on Systems, Man, and Cybernetics (SMC), Budapest, Hungary. Retrieved from https://ieeexplore.IEEE.org/documenU7844992?source=IQplus.

\* cited by examiner

200A

200B

500C

NETWORK ACCESS TOKENS AND META-APPLICATION PROGRAMMING INTERFACES FOR ENHANCED INTER-ENTERPRISE SYSTEM DATA PROMULGATION AND PROFILING

BACKGROUND

Client applications can access resources from servers. In many cases, applications utilize identifiers of user profiles to access information related to a user. However, synchronizing data structures in a networked environment across many disparate computing systems is challenging, because it unnecessarily occupies excessive network resources, and creates additional security risks for breaches of user information when accessing and synchronizing information stored in user profiles.

SUMMARY

Embodiments of the systems and methods of the technical solutions disclosed herein solve these and other issues by providing network tokens, which can specify certain portions of data maintained at secondary computing systems. In conventional computing systems that share information, several application programming interface (API) calls are each used to retrieve specific data. However, maintaining information about the parameters and attributes of each API call, as well as the additional code to organize and update each API call for each secondary computing system, utilizes excessive computational resources and reduces overall available network bandwidth. For example, when several data records must be synchronized across a primary and a secondary computing system, several API calls must be made to perform this data transfer. These problems compound when tokens are required to authorize access to each data record, as specific tokens must be created through a communication handshake for each synchronized resource.

Moreover, embodiments of the systems and methods of the technical solutions disclosed herein solve these issues by providing network tokens, which may be generated to specify a specific subset of data records or resources at a secondary computing system that a primary computing system is authorized to access. Additionally, the systems and methods the present disclosure provide meta-API calls, which allow for a single API call to be used to request several portions of disparate data maintained at a secondary computing system. By utilizing a single API call for several portions of information, the present techniques reduce the overall utilization of network bandwidth (e.g., by requiring significantly fewer communications between the primary and secondary computing systems) of the system, while maintaining the privacy and security of protected information.

One aspect of the present disclosure relates to a method for retrieving information from secondary computing systems using network access tokens. The method can be performed, for example, by one or more processors coupled to a memory. The method can include providing a user interface that lists a plurality of secondary computing systems to a client application executing at a client device associated with a user profile of the primary computing system. The method can include, responsive to detecting a selection of a secondary computing system of the plurality of secondary computing systems at the user interface, receiving, from the client device, a network token identifying a permission for accessing a second profile maintained at the secondary computing system. The method can include determining a subset of data records of the second user profile that the primary computing system is permitted to access. The method can include retrieving the subset of data records from the secondary computing system according to a retrieval policy. The method can include updating the user interface at the client application to present the subset of data records of the second profile.

In some implementations, the method can further include receiving, from the secondary computing system, authorization to access an application programming interface of the secondary computing system. In some implementations of the method, the subset of data records can be retrieved using the API of the secondary computing system. In some implementations of the method, determining the subset of data records can include parsing the network token received from the client device.

In some implementations, the method can further include updating the user profile based on the subset of data records of the second profile. In some implementations of the method, the network token can indicate that the subset of data records can be accessed periodically. In some implementations of the method, retrieving the subset of data records from the secondary computing device can include periodically retrieving the subset of data records from the secondary computing device. In some implementations of the method, retrieving the subset of data records from the secondary computing device can include performing a single API call using the API of the secondary computing system.

In some implementations of the method, the single API call can include one or more parameters identified in the network token. In some implementations of the method, the network token can include an expiration time stamp. In some implementations of the method, it can include, and further including providing a prompt to the client application indicating that the network token has expired responsive when a current time exceeds the expiration time stamp.

Another aspect of the present disclosure relates to a system for retrieving information from secondary computing systems using network access tokens. The system can include one or more processors coupled to a memory. The system can provide a user interface that lists a plurality of secondary computing systems to a client application executing at a client device associated with a user profile of the primary computing system. The system can, responsive to detecting a selection of a secondary computing system of the plurality of secondary computing systems at the user interface, receive, from the client device, a network token identifying a permission for accessing a second profile maintained at the secondary computing system. The system can determine a subset of data records of the second user profile that the primary computing system is permitted to access. The system can retrieve the subset of data records from the secondary computing system according to a retrieval policy. The system can update the user interface at the client application to present the subset of data records of the second profile.

In some implementations, the system can receive, from the secondary computing system, authorization to access an application programming interface of the secondary computing system. In some implementations of the system, the subset of data records can be retrieved using the API of the secondary computing system. In some implementations of the system, determining the subset of data records can include parsing the network token received from the client device.

In some implementations, the system can update the user profile based on the subset of data records of the second profile. In some implementations of the system, the network token can indicate that the subset of data records can be accessed periodically. In some implementations of the system, retrieving the subset of data records from the secondary computing device can include periodically retrieving the subset of data records from the secondary computing device.

In some implementations of the system, retrieving the subset of data records from the secondary computing device can include performing a single API call using the API of the secondary computing system. In some implementations of the system, the single API call can include one or more parameters identified in the network token. In some implementations of the system, the network token can include an expiration time stamp. In some implementations, the system can provide a prompt to the client application indicating that the network token has expired responsive when a current time exceeds the expiration time stamp.

At least one other aspect of the present disclosure relates to a non-transient computer-readable storage medium having computer-executable instructions embodied thereon, which when executed by one or more processors, causes the one or more processors to perform a method for retrieving information from secondary computing systems using network access tokens. The method can include providing a user interface that lists a plurality of secondary computing systems to a client application executing at a client device associated with a user profile of the primary computing system. The method can include, responsive to detecting a selection of a secondary computing system of the plurality of secondary computing systems at the user interface, receiving, from the client device, a network token identifying a permission for accessing a second profile maintained at the secondary computing system. The method can include determining a subset of data records of the second user profile that the primary computing system is permitted to access. The method can include retrieving the subset of data records from the secondary computing system according to a retrieval policy. The method can include updating the user interface at the client application to present the subset of data records of the second profile.

In some implementations of the computer-readable storage medium, the method can include receiving, from the secondary computing system, authorization to access an application programming interface of the secondary computing system.

At least one aspect of the present disclosure is directed to another method. The method may be performed, for example, by a primary computing system having one or more processors coupled to memory. The method can include receiving, from a client device, a request for an energy profile based on one or more data records maintained by at least one secondary computing system. The request can include at least one network token corresponding to the at least one secondary computing system. The method can include determining that the network token is a valid network token that permits access to the one or more data records maintained by the at least one secondary computing system. The method can include retrieving the one or more data records from the secondary computing system. The method can include generating the energy profile based on the one or more data records retrieved from the secondary computing system. The method can include providing, for presentation at the client device, a user interface that displays information in the energy profile.

In some implementations, each data record of the one or more data records identifies a respective device and comprises a respective energy usage value of the respective device. In some implementations, generating the energy profile is further based on the respective energy usage value of the respective device identified in each of the one or more data records. In some implementations, a data record of the one or more data records identifies a respective activity and a respective activity metric corresponding to a magnitude of the respective activity. In some implementations, generating the energy profile is further based on the respective activity metric of the respective activity identified the data record.

In some implementations, generating the energy profile comprises determining at least one carbon footprint value based on a data record of the one or more data records. In some implementations, retrieving the subset of data records from the secondary computing device comprises periodically retrieving the one or more data records from the secondary computing device. In some implementations, the method can include receiving, from the secondary computing system, authorization to access an API of the secondary computing system. In some implementations, the one or more data records are retrieved using the API of the secondary computing system. In some implementations, retrieving the one or more data records from the secondary computing device comprises performing a single API call using the API of the secondary computing system.

At least one other aspect of the present disclosure is directed to another system. The system can include a primary computing system having one or more processors coupled to memory. The system can receive, from a client device, a request for an energy profile based on one or more data records maintained by at least one secondary computing system. The request can include at least one network token corresponding to the at least one secondary computing system. The system can determine that the network token is a valid network token that permits access to the one or more data records maintained by the at least one secondary computing system. The system can retrieve the one or more data records from the secondary computing system. The system can generate the energy profile based on the one or more data records retrieved from the secondary computing system. The system can provide, for presentation at the client device, a user interface that displays information in the energy profile.

In some implementations, each data record of the one or more data records identifies a respective device and comprises a respective energy usage value of the respective device. In some implementations, the system can generate the energy profile further based on the respective energy usage value of the respective device identified in each of the one or more data records. In some implementations, a data record of the one or more data records identifies a respective activity and a respective activity metric corresponding to a magnitude of the respective activity. In some implementations, the system can generate the energy profile further based on the respective activity metric of the respective activity identified the data record.

In some implementations, the system can generate the energy profile based on determining at least one carbon footprint value based on a data record of the one or more data records. In some implementations, the system can retrieve the subset of data records from the secondary computing device by periodically retrieving the subset of data records from the secondary computing device. In some implementations, the system can receive, from the secondary computing system, authorization to access an application programming interface (API) of the secondary computing system. In some implementations, the subset of data records are retrieved using the API of the secondary computing system. In some implementations, the system can retrieve the one or more data records from the secondary computing device by performing a single API call using the API of the secondary computing system.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of "a," "an," and "the" include plural referents unless the context clearly dictates otherwise.

DETAILED DESCRIPTION

Figure 1:
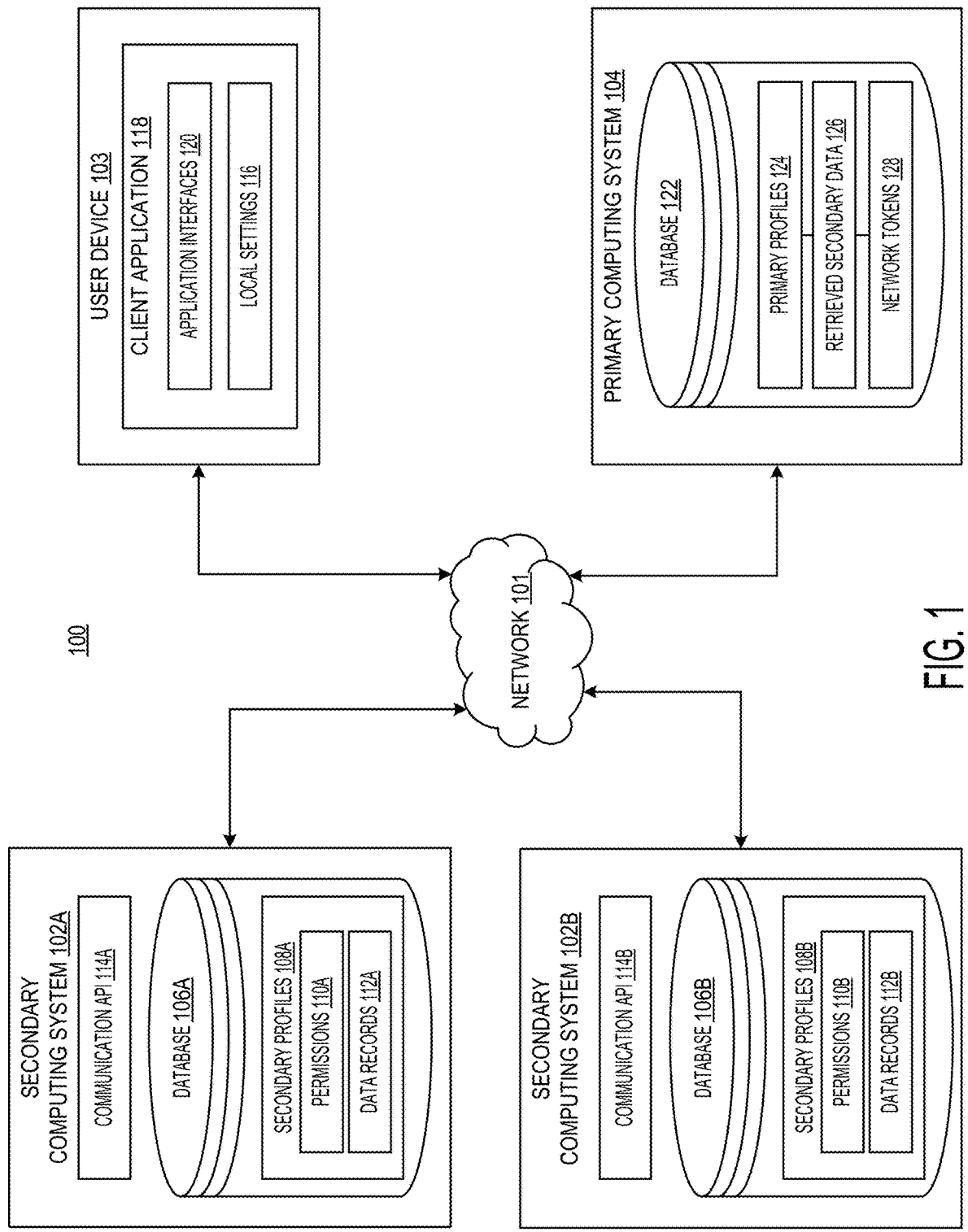
FIG. 1 is a block diagram of an example system for retrieving information from secondary computing systems using network access tokens, in accordance with one or more example implementations.

Below are detailed descriptions of various concepts related to, and implementations of, techniques, approaches, methods, apparatuses, and systems for retrieving information from secondary computing systems using network access tokens. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes systems and methods retrieving information from secondary computing systems using network access tokens;

Section B describes systems and methods for generating environmental profiles based on information retrieved using network access tokens; and Section C describes a computing environment which may be useful for practicing embodiments described herein.

A. Systems and Methods for Retrieving Information from Secondary Computing Systems Using Network Access Tokens One aspect of the present disclosure is directed to systems and methods for retrieving information from secondary computing systems using network access tokens. In conventional computing systems that share information, several API function calls are each used to retrieve data that is specific to the API call. This can work generally for small volumes of data for a small number of users. However, this solution becomes impracticable to maintain as the number of users, and the types of information retrieved or shared, increases in volume. Information about the parameters and attributes of each API call, as well as the additional code to organize and update each API call for each secondary computing system, utilizes excessive computational resources and reduces overall available network bandwidth.

One approach to circumvent this complexity is to use one simple API function call to synchronize all data maintained at a secondary computing system. Although this comes with the advantage of easy maintainability and low complexity, the resulting data transfer exposes large volumes of data to potential security breaches. Furthermore, it shifts the responsibility to the retrieving computing system to sift through the large volume of data to identify one or more relevant data entries. The extra retrieved data may be discarded, or stored in the event that it may be useful for other purposes by the requesting computing system. Although this approach may solve some of the above-identified issues, it still suffers from excessive use of networking resources. This problem becomes particularly apparent when frequent updates to the data stored at secondary computing systems are required, across a large number of secondary computing systems.

The systems and methods of this technical solution solve these and other issues by providing network tokens, which may be generated to specify a specific subset of data records or resources at a secondary computing system that a primary computing system is authorized to access. Additionally, the systems and methods the present disclosure provide meta-API calls, which allow for a single API call to be used to request several portions of disparate data maintained at a secondary computing system. By utilizing a single API call for several portions of information, the present techniques reduce the overall utilization of network bandwidth (e.g., by requiring significantly fewer communications between the primary and secondary computing systems) of the system, while maintaining the privacy and security of protected information. These and other improvements are described in greater detail herein below.

In an example use case, a primary computing system can implement the present techniques to generate a network user profile for a user from information gathered from a number of secondary computing systems. Data from the secondary computing systems that make up the network user profile can be accessed by a user via a client application executed on a user device of the user. The user device may be a smart phone, a laptop, or another type of computing system capable of communicating with the primary computing system and the secondary computing systems. The network user profile may include any information from the secondary computing systems that are authorized by the user via the user device. The user device can communicate with the primary computing system and the secondary computing systems to generate network tokens, which can be used by the primary computing system to access and synchronize specific information (authorized by the user) at the secondary computing systems. The primary computing system can synchronize data from the secondary computing systems using one or more network tokens until a network user profile can be generated. The network user profile can be presented in one or more user interfaces at the user device, or utilized in various additional network processing operations as described herein.

FIG. 1 is a block diagram of an example system 100 for retrieving information from secondary computing systems using network access tokens, in accordance with one or more example implementations. The system 100 may include secondary computing systems 102A and 102B (which may include one or more computing devices of third-party enterprises in one or more locations), collectively referred to as secondary computing systems 102 (or in the singular, a "secondary computing system 102"), one or more user devices 103 (which may include multiple computing devices of one or more users in one or more locations), one or more primary computing systems 104. Each of the secondary computing systems 102, the primary computing system 104, and the user device(s) 103 can be in communication with one another via the network 101. The network 101 can facilitate communications among the secondary computing systems 102, the user device 103, and the primary computing system 104 over, for example, the internet or another network via any of a variety of network protocols such as Ethernet, Bluetooth, Cellular, or Wi-Fi.

Each of the secondary computing systems 102 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The secondary computing systems 102 can include one or more computing devices or servers that can perform various functions as described herein. The secondary computing systems 102 can include any or all of the components and perform any or all of the functions of the computer system 700 described herein in conjunction with FIG. 7.

The secondary computing systems 102 may be computing systems of information technology service providers, financial service providers, non-financial service providers, or any other computing system that may maintain information about or relating to one or more users. For example, secondary computing systems 102 of non-financial institutions may be associated with marketing platforms, social media platforms, network environment platforms, network configuration platforms, or user databases, among others. The secondary computing systems 102 may each include one or more network interfaces that facilitate communication with other computing systems of the system 100 via the network 101. In some implementations, one or more of the secondary computing systems may be owned or controlled by a single entity.

The user device 103 can include at least one processor and a memory (e.g., a processing circuit). The memory can store processor-executable instructions that, when executed by processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The user device 103 can include one or more computing devices or servers that can perform various functions as described herein. The user device 103 can include any or all of the components and perform any or all of the functions of the computer system 700 described herein in conjunction with FIG. 7.

Each user device 103 may include one or more mobile and non-mobile devices such as smartphones, tablet computing devices, wearable computing devices (e.g., a smartwatch, smart optical wear, etc.), personal computing devices such as laptops or desktops, voice-activated digital assistance devices (e.g., smart speakers having chat bot capabilities), portable media devices, vehicle information systems, etc., that may access one or more software applications running locally or remotely. The user device 103 may operate as a "thin client" device, which presents user interfaces for applications that execute remotely (e.g., at the primary computing system 104, the secondary computing system(s) 102, etc.). Input from the user received via the thin client may be communicated to the server executing the remote application, which may provide additional information to the user device 103 or execute further operations in response to the user input. In some examples, a user may access any of the computing devices of the system 100 through various user devices 103 at the same time or at different times. For example, the user may access one or more computing systems of the system 100 via a digital assistance device 103 while also accessing one or more computing systems of the system 100 using a wearable computing device 103 (e.g., a smart watch). In other examples, the user may access one or more computing systems of the system 100 via a digital assistance device 103 and later access the system 100 via a vehicle information system 103, via desktop computing system, or a laptop computing system.

The user device 103 can execute a client application 118, which may provide one or more user interfaces and receive user input via one or more input/output (I/O) devices. The client application 118 may be administered by the primary computing system 104 (via, e.g., data exchanged between the client application 118 and the primary computing system 104 through secured communications). In some implementations, the client application 118 may be a web-based application that is retrieved and displayed in a web-browser executing at the primary computing system 104. In some implementations, the client application 118 can execute locally at the user device 103, and may communicate information with the secondary computing systems 102 or the primary computing system 104 via the network 101. The client application 118 may present one or more user interfaces (e.g., such as the user interfaces described in connection with FIGS. 2A-2E), for example, in response to user input or interactions with displayed interactive user interface elements.

The primary computing system 104 can include at least one processor and a memory (e.g., a processing circuit). The memory can store processor-executable instructions that, when executed by processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The primary computing system 104 can include one or more computing devices or servers that can perform various functions as described herein. The primary computing system 104 can include any or all of the components and perform any or all of the functions of the computer system 700 described herein in conjunction with FIG. 7.

In some embodiments, the primary computing system 104 may be the computing system of an entity that maintains user profiles (e.g., the primary profiles 124) for a number of different users. The primary computing system 104 can provide information to the client application 118 executing on the user devices 103, such as user interfaces, instructions to carry out one or more functionalities described herein, or other information relating to the user profiles. The user can utilize the client application 118 to communicate with the primary computing system 104, for example, to create, modify, delete, or authorize information in connection with a primary profile 124 associated with the user. In some implementations, the primary computing system 104 can be backend computer system that interacts with the user devices 103 and supports various services offered by the primary computing system 104, such as information technology (IT) services or network management services. The network management services may utilize the information in one or more of the primary profiles 124 to manage information communicated via the network 101.

The primary computing system 104 can maintain, manage, or store primary user profiles 124, for example, in one or more data structures in the memory of or a database managed by the primary computing system 104. Each of the primary user profiles 124 may correspond to a respective user, and may be identified by a corresponding user identifier (e.g., a username, an email address, a passcode, an encryption key, etc.). The primary user profiles 124 can include any information about the user, including personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., income, assets, credit score), or other user or account data that is maintained or otherwise accessible to the primary computing system 104. The primary computing system 104 can receive the primary data 124 or subsets thereof via the client application 118.

The primary user profiles 124 can be stored in association with one or more identifiers of one or more user devices 103. Each of the primary user profiles 124 can be a profile that includes information about a user, and information about one or more of the user devices 103 used to access the primary computing system 104 using the primary user profiles 124. As described herein, identifiers of a primary user profile 124 can be used to access the functionality of the primary computing system 104. The identifiers can include a username, a password, an e-mail address, a phone number, a personal identification number (PIN), a secret code-word, or device identifiers for use in a two-factor authentication technique, among others. The primary user profiles 124 can store information about, and be associated with, retrieved secondary data 126 (which may be retrieved from the secondary computing systems 102, as described herein), and any network tokens 128 with which the primary computing system 104 accesses the secondary computing systems 102.

In some implementations, the primary user profiles 124 can store one or more attributes, which may include a client device identifier of a user device 103 that was used to interact with the primary computing system 104, identifiers of one or more secondary computing systems 102 associated with the primary user profile 124, or information relating to the user, among other information. The primary user profiles 124 can also include historic records of online activity that the user has performed using the corresponding primary user profiles 124, for example, at the primary computing system 104 or via other computing systems or the user device 103. The primary user profiles 124 can store information about a user device 103 used to access the session processing system 205 such as an Internet Protocol (IP) address, a MAC address, a GUID, an user profile name (e.g., the name of a user of the user device 103, etc.), device name, among others. In some implementations, a primary user profile 124 can be created by the primary computing system 104 in response to a primary user profile 124 creation request transmitted by a user device 103. The user profile creation request can include any of the user profile information described herein. The primary user profiles 124 can include information about an account (e.g., a financial account) maintained by an entity associated with the primary computing system 104. The information can include, for example, account balances, transaction histories, or brokerage trading information, among other account data. The attributes of the primary user profiles 124 can include a list or table of secondary account identifiers (e.g., the secondary account data 126) associated with the primary user profile 124.

The retrieved secondary data 126 can be associated with a respective primary user profile 124, and can include information retrieved by the primary computing system 124 from the secondary computing systems 102 utilizing the techniques described herein. In some implementations, the retrieved secondary data 126 may be subsets of information stored as the data records 112A or 112B stored at the secondary computing systems 102. The retrieved secondary data 126 may be associated with one or more network tokens 128, which themselves may be associated with a respective secondary computing system 102. The retrieved secondary data 126 may be periodically updated (e.g., retrieved) by the primary computing system 104 from the corresponding secondary computing system, for example, according to a predetermined schedule. In some implementations, the retrieved secondary data 126 can be retrieved from the secondary computing systems 104 in response to a request received from a user device 103. The primary computing system 104 can provide a subset of, or all of, the retrieved secondary data 126 to the user device 103 for display. In some implementations, information in the retrieved secondary data 126 and information in the primary profiles 124 can be utilized to perform targeted advertising, or to derive insights regarding a financial position of a user. For example, the primary computing system 104 can access transaction information received in the retrieved secondary information 126, for example, to determine income information and spending information over predetermined time periods.

The secondary computing systems 102A and 102B can include databases 106A and 106B, respectively (collectively referred to as "databases 106"), which may store secondary profiles 108A or 108B (sometimes referred to collectively as the "secondary profiles 108" or in the singular as a "singular profile 108"). The secondary profiles 108 may be associated with a corresponding user, and may be similar to the primary user profiles 124, but including information relating to the secondary computing system 102 rather than the primary computing system 104. The secondary profiles 108 can store corresponding data records 112A or 112B (sometimes referred to as the "data record(s) 112"), which can include information about the users associated with the respective secondary profile 108. The user devices 103 can access the respective secondary computing system 102 using the secondary profile 108 of the respective secondary computing system 102, and create, modify, or delete one or more data records 112 associated with the user's secondary profile 108.

The data records 112 may include any information about a user that accesses the secondary computing systems 102, including any information relating to interactions on web documents performed via a user device 103 in communication with the secondary computing system 102, information about online activity performed via the user device 103, or communication metadata (e.g., IP address, lists of device identifiers, etc.) relating to a user when the user communicates with the secondary computing system 102. The data records 112 can include data identifying a user of the secondary computing systems 102. For example, the data records 112 can include personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), and financial data (e.g., income, assets, credit score), or other user or account data that is maintained or otherwise accessible to one or more secondary computing systems 102.

The secondary computing systems 102 can receive the data records 112 or subsets thereof via communications with the user device 103. For example, an application associated with the secondary computing system 102 may be executed on the user device 103 of the user. The user can utilize the application associated with the secondary computing system 102, which can present one or more user interfaces to receive user input, to communicate one or more data records 112 (or information that the secondary computing system 102 stores as the data records 112) to the secondary computing system 102. The application may utilize a secondary profile 108 of the user to access the secondary computing system 102. The secondary computing system 102 can store the data records 112 in association with an identifier of the user, or an identifier of a secondary profile 108 with which the user accesses the secondary computing system 102. In some implementations, the secondary computing system 102 may update, modify, or create one or more data records based on a service accessed by the user that is provided by an entity associated with the secondary computing system. For example, if the secondary computing system 102 is associated with a finance company, the secondary computing system 102 can update data records 112 in a secondary profile 108 of a user, which correspond to timely payments made by the user. Generally, the secondary profiles 108 may include any information that is included in the primary profile 124.

The secondary profiles 108 may specify one or more permissions 110A or 110B (sometimes referred to as "permission(s) 110"), which can be associated with corresponding data records 112 of a secondary profile 108. The permissions 110 can specify which of the data records 112 may be shared with the primary computing system 104. The permissions 110 can indicate time periods that certain data records 112 can be shared with or retrieved by the primary computing system 104. In some implementations, each of the data records 112 may be associated with default permissions 110, which can indicate that the data records 112 may not be shared with the primary computing system 104. In response to one or more requests received from a user device 103, for example. In some implementations, permissions 110 may be modified according to one or more network tokens 128 generated at the secondary computing system 102 using the techniques described herein.

The network tokens 128 may be generated by the secondary computing systems 102, for example, in response to a request from the client application 118 executing on the user device 103. The network tokens 128 may be encoded with values generated, for example, using a hashing algorithm or an encryption algorithm, which represent a corresponding subset of data records 112 that the primary computing system 104 can access from a respective secondary profile 108. If a user has more than one secondary profile 108 across multiple secondary computing systems 102, the primary computing system can maintain at least one network token 128 for that user for each secondary profile 108 associated with the user. When generated by the secondary computing system 102 in response to a request from a user device 103 of a user, a corresponding permission 110 can be recorded in a secondary profile 108 that indicates corresponding data records 112 that the network token 128 is permitted to access. Generating the network token 128 can include hashing a unique value, for example, a timestamp of the request concatenated with an identifier of the secondary profile 108 (and in some implementations, further concatenated with an additional salt value).

The permissions 110 corresponding to the generated network token 128 can identify the network token 128 (e.g., a predetermined number of least-significant or most-significant bits of the network token 128, which may be stored in association with the respective secondary profile 108) and can identify a subset of the data records 112 of the respective secondary profile 108 that the primary computing system 104 is permitted to access. Additionally, the permissions 110 can be stored in association with access rules for the network token 128, which may include an expiration time (after which the network token 128 is considered invalid, or after which the secondary computing system 102 deletes the corresponding permission 110 preventing the primary computing system 104 from accessing the associated data records 112), a timestamp corresponding to network token 128 creation time, an identifier of the user device 103 that was used to request the network token 128, an identifier of the secondary profile 108 corresponding to the network token 128, a retrieval schedule identifying predetermined time periods during which the primary computing system 104 can access (e.g., update the retrieved secondary data 126) the subset of the data records 112 with the network token 128, or an identifier of the primary computing system 104 that is authorized to access a subset of the data records 112 of the secondary profile 108 using the network token 128, among others.

The secondary computing systems 102 can maintain and provide the communications application programming interfaces (APIs) 114A and 114B (sometimes referred to herein as the "communications API 114"). The communications API 114 can be an API, such as a web-based API corresponding to a particular network address uniform resource identifier (URI), or uniform resource locator (URL), among others. The communications API 114 can be accessed, for example, by one or more of the primary computing system 104 or the user device 103, via the network 101. In some implementations, other secondary computing systems 102 can communicate with a secondary computing system 102 via the communication API 114. The communications API 114 can be a client-based API, a server API (SAPI), or an Internet Server API (ISAPI). Various protocols may be utilized to access the communications API 114, including a representational state transfer (REST) API, a simple object access protocol (SOAP) API, a Common Gateway Interface (CGI) API, or extensions thereof. The communications API 114 may be implemented in part using a network transfer protocol, such as the hypertext transfer protocol (HTTP), the secure hypertext transfer protocol (HTTPS), the file transfer protocol (FTP), the secure file transfer protocol (FTPS), each of which may be associated with a respective URI or URL.

The primary computing system 104 may store identifiers (e.g., access rules, network locations) corresponding to the communication APIs 114 maintained at each of the secondary computing systems 102. Each secondary computing system 102 can maintain its own access rules and identifiers for their respective communication APIs 114. When changes or updates are made to the communications API 114, corresponding access rule changes or identifiers can be transmitted to the primary computing system 104, to allow the primary computing system 104 to utilize the communication API 114 using the most up-to-date access rules. In some implementations, the primary computing system 104 can periodically (or in response to a request) retrieve the most up-to-date access rules for the communication API 114. Likewise, in some implementations, the secondary computing systems 102 may periodically (or in response to a request) provide the access rules for the communication API 114 to the primary computing system 104. In some implementations, the access rules may be communicated as part of a network token 128.

Calls to the communication API 114 can include additional information that may be specified as part of a "meta-API call," which allows the primary computing system 104 to retrieve information in batch for particular sets of users. This can allow the primary computing system 104 to reduce overall consumption of network resources when retrieving data records 112 from the secondary computing systems 102. The meta API call may utilize additional metadata associated with the network token 128 (e.g., which may be encrypted or encoded such that only the respective secondary computing system 102 corresponding to the API call can access the additional metadata), which specifies corresponding information that the network token 128 authorizes the primary computing system 104 to access. This enables the primary computing system 104 to make a single, simple API call to the communication API 114 to retrieve only the information authorized for a network token 128 associated with a particular user. To further improve efficiency, the primary computing system 104 can transmit a single batch API call to the communications API 114, which may include a list or single data blob of several network tokens 128 (and any encrypted or encoded metadata associated with the network tokens 128), each corresponding to a respective user.

In response, the secondary computing system 102 can retrieve the information authorized by the network tokens 128 (and any encrypted metadata), which may correspond to data records 112 from several users, and transmit the information to the primary computing system 104 in a single message, or in several streamed messages forming a single response. This enables the primary computing system 104 to intelligently aggregate requests for information from a secondary computing system 102, such that large segments of disparate data from several users can be retrieved in a single API call. This frees up network resources significantly, particularly when the primary computing system 104 must retrieve data associated with several users from several secondary computing systems 102. In effect, this can reduce the number of API calls (and therefore communication sessions) down to just the number of secondary computing systems 102 that the primary computing system 104 must access, rather than performing a single API call on a per-user basis.

The user device 103 can execute the client application 103, which can present one or more user interfaces via a display device. The display device may be an interactive display device, such as a touch screen display (e.g., a capacitive or a resistive touchscreen display, etc.). Additionally, the user device may include additional input/output features, such as buttons (e.g., a keyboard), pointing devices (e.g., a mouse, a touchpad, a remote, a controller, etc.) to enable a user operating the user device 103 to provide input to (and observe output from) from the client application 118. The client application 118 can present one or more actionable objects (e.g., interactive user interface elements) in a user interface of the client application 118 via the display of the user device 103. Such actionable objects can include selectable hyperlinks, buttons, graphics, videos, images, or other application features that generate a signal that is processed by the application executing on the respective user device 103. Examples of interactive user interface elements are described in connection with FIGS. 2A-2E, which also depict various user interfaces (sometimes referred to herein as "application interfaces") that show different types of retrieved secondary data 126 and information related to the techniques described herein.

In some implementations, one or more user devices 103 can establish one or more communication sessions with the primary computing system 104 or one or more secondary computing systems 102. The one or more communication sessions can each include one or more channels or connections between the one or more user devices 103 and the primary computing system 104 or the secondary computing systems 102. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

The client application 118 executing on the user device 103 can communicate via the network 101 to access information resources, such as web pages via a web browser, or application resources via a native application executing on a user device 103. When accessing information resources, the user device 103 can execute instructions (e.g., embedded in the native applications, in the information resources, etc.) that cause the user device 103 to display application interfaces 120. The application interfaces 120 can be, for example, user interfaces that present different types of configuration interfaces for the primary user profiles 124 maintained by the primary computing system 104, such an interface to create a primary user profile 124, an interface to modify a primary user profile 124, an interface to communicate with a secondary computing system 102, or an interface to modify permissions 110 or generate a network token 128, among others. Generally, a user interface and any associated interactive user interface elements can be presented to the user via the client application 118 to perform any of the techniques described herein.

The application interfaces 120 can, in some implementations, cause the user device 103 to communicate with the primary computing system 104. For example, the application 118 can be used to transmit a request to create a primary user profile 124. The request to create a primary user profile 124 can include, for example, login credentials, other identifying information, identifiers of the user device 103, identifiers of one or more user attributes to associate with the primary user profile 124, or any other information related to primary user profiles 124 as described herein. In some implementations, the application interfaces 120 can include an interface to display the retrieved secondary data 126, which may include information from data records 112 that the user has authorized the primary computing system 104 to access. Examples of such application interfaces 120 are displayed in FIGS. 2A-2E.

Figure 2A:
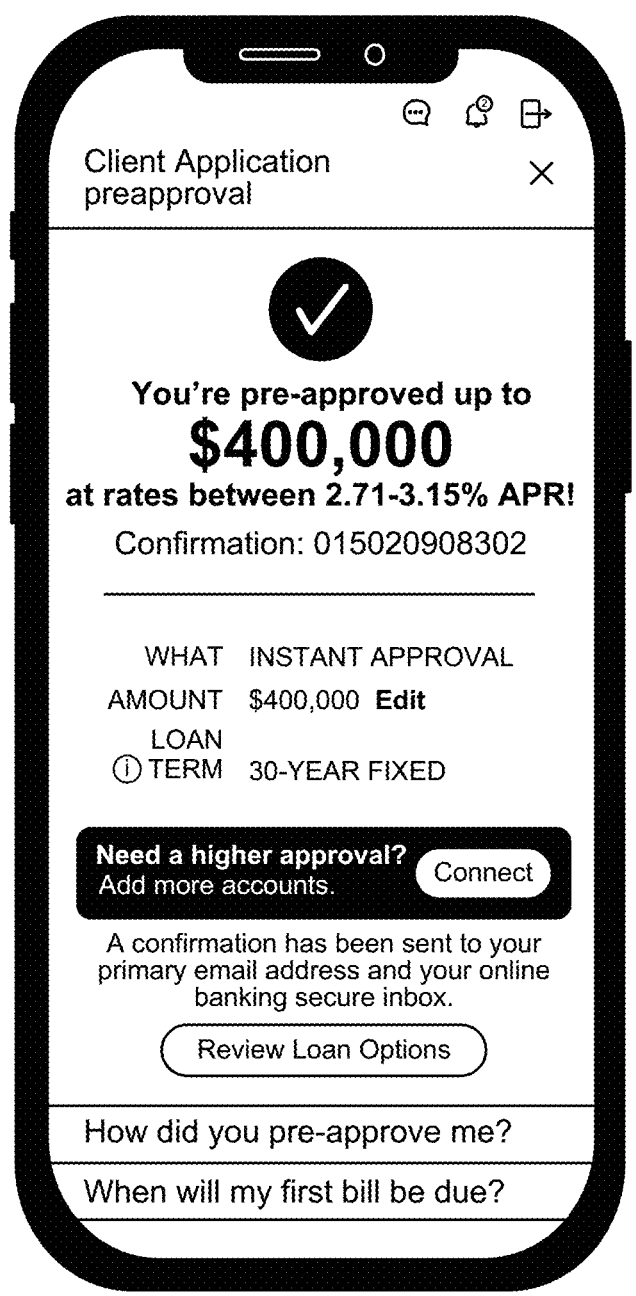
FIGS. 2A, 2B, 2C, 2D, and 2E depict example views of a client application that communicates with and facilitates performance of some of the techniques described in connection with FIG. 1, in accordance with one or more example implementations.
Figure 2B:
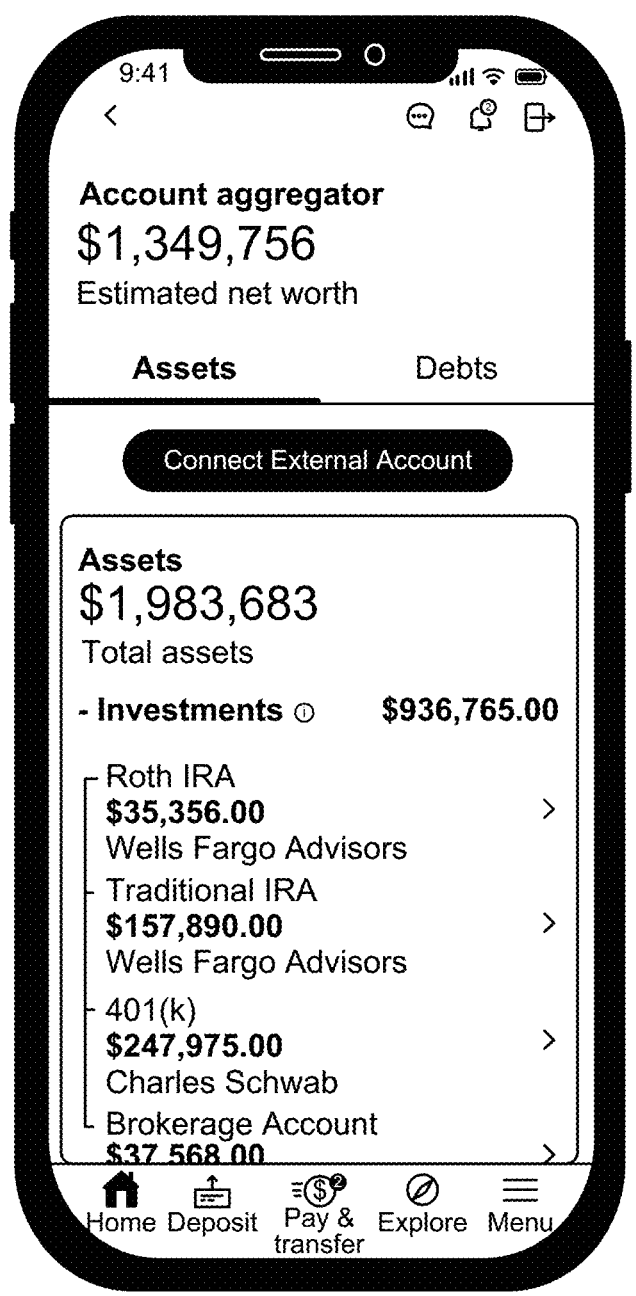

Referring to FIG. 2A, illustrated is an example application interface 200A, which displays an example notification indicating pre-approval of a mortgage. This notification may be stored as part of the primary user profile 124, and displayed when the user accesses an application interface 120 corresponding to the primary computing system 104. Additional primary user profile information is displayed in FIG. 2B, which depicts an example application interface 200B that shows various information relating to account balances maintained as part of the primary profile 124. It should be understood that while account balance information is shown in FIGS. 2A-2E, that any information stored as part of a primary user profile 124 may be presented to a user in the application interfaces 120.

Referring back to FIG. 1, the client application 118 can additionally present application interfaces 120 that cause the user device 103 to communicate one or more secondary computing systems 102. For example, the primary computing system 104 may transmit instructions that cause the client application 118 to present an application interface 120 that presents options to generate a network token 128 for the primary computing system 104 to access data records 112 at one or more secondary computing systems 102. Such an example interface is shown in FIG. 2C.

Figure 2C:
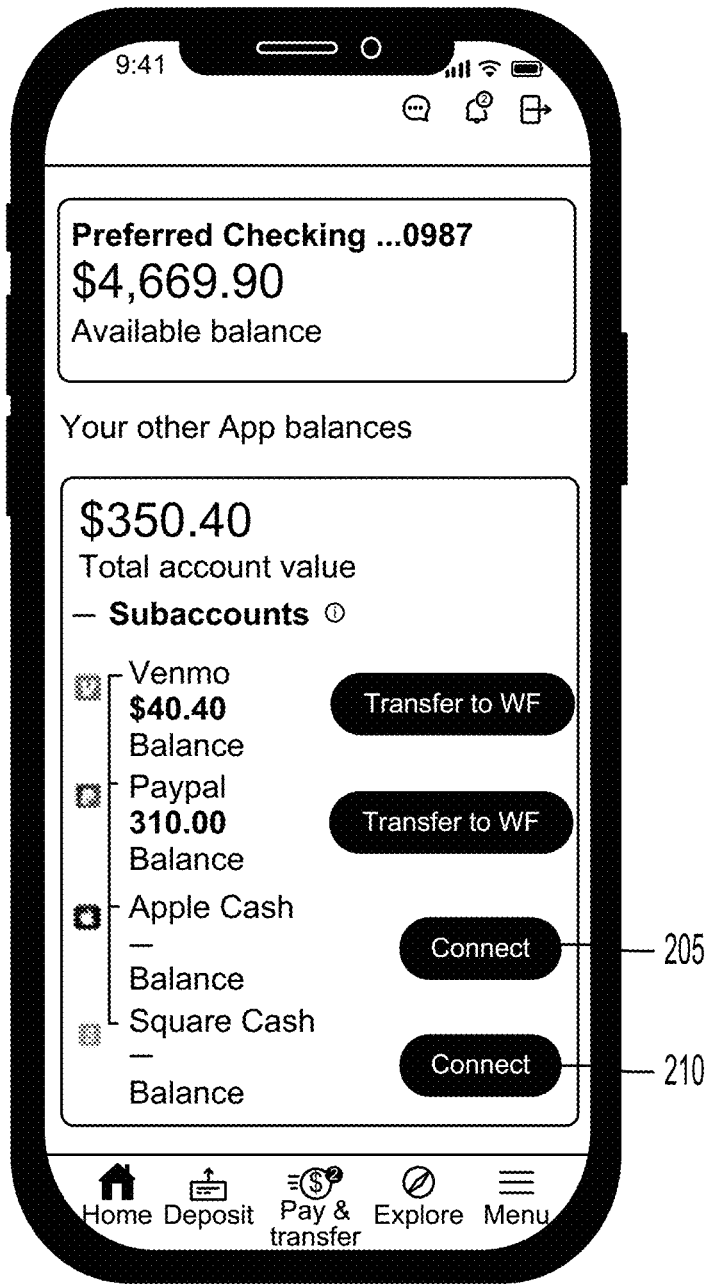

Referring briefly to FIG. 2C, illustrated is an example application interface 200C that depicts interactive user interface elements 205 and 210. The interactive user interface elements 205 and 210, when interacted with, can cause the client application 118 to communicate with the secondary computing system 102 associated with the respective user interface element 205 or 210. The communication can include a request to generate a network token 128. In response to the request, the secondary computing system 102 can transmit instructions (which can include one or more data structures including corresponding information to populate user interface elements) to display user interfaces that allows the user to specify particular data records 112 that the primary computing system 104 is authorized to access. Additionally, the user can specify access rules, such as expiration times, or periods of time that the primary computing system 104 can access the information, via one or more application interfaces 120.

Figure 2D:
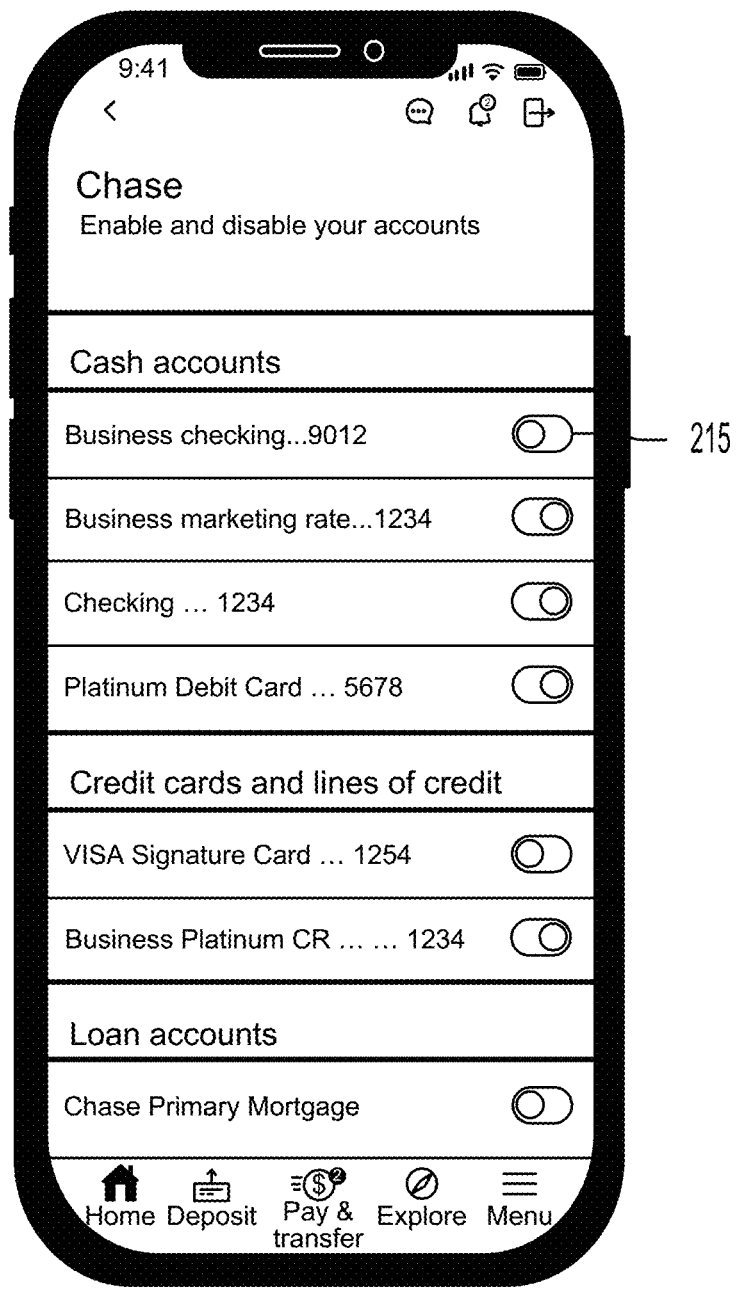

An example of an application interface 120 that shows interactive user interface elements that allow the user to select data records 112 to authorize is shown in FIG. 2D. Referring to FIG. 2D, illustrated is an example application interface 200D. As shown, the interactive toggle user interface elements can be used to specify which data records 112 (shown here as particular account information) can be accessed by the primary computing system 104. When the user interacts with an interactive toggle, the user device 103 can transmit a message to the respective secondary computing system 102 associated with the data record 112, to update the permissions 110 associated with a respective network token 128 for the secondary computing system 102. When the user has completed their selections, the secondary computing system 102 can generate and transmit the network token 128 to the user device 103 (or to the primary computing system 104). The generated network token 128 can include the encrypted or encoded metadata that indicates the subset of the data records 112 indicated in the permissions 110, which correspond to the user selections in FIG. 2D.

Figure 2E:
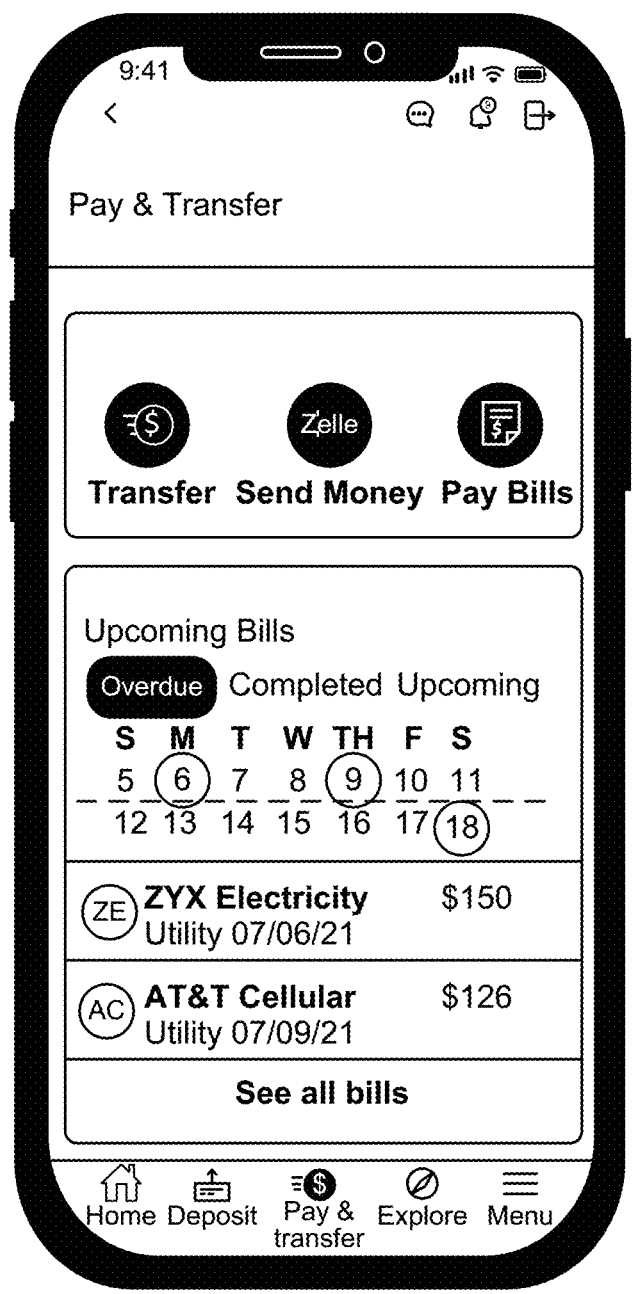

Referring back to FIG. 1, the primary computing system 104 can access the selected data records 112 using the network 101 and the communication API 114, as described herein. This information can then be displayed to the user in additional application interfaces 120, for example, as shown in FIG. 2E. The data records 112 can be retrieved by the primary computing system 104 and stored as the retrieved secondary data 126. The retrieved secondary data 126 may be updated by the primary computing system 104 periodically, or according to a predetermined (or user-specified) schedule, as described herein. The primary computing system 104 can transmit portions (or the entirety of) the retrieved secondary data 126 to the user device 103 for display in an application interface 120, such as the application interface 200E depicted in FIG. 2E.

Referring briefly to FIG. 2E, illustrated is an example application interface 200E that depicts example retrieved secondary data 126. As shown, the retrieved secondary data 126 in this example includes information about utility bills, such as due dates, account balances, and previously completed and upcoming payments. However, it should be understood that this is just an example implementation, and that any type of information stored in the data records 112 can be displayed in the application interface 200E.

Referring back to FIG. 1, the client application 118 executing on the user device 103 can include local settings 116, which may include stored preferences (e.g., arrangements of the retrieved secondary data 126 displayed in the client application 118, personal user settings, saved login information, stored network tokens 128, etc.) or other information relating to the use of the client application 118. The local settings 116 can be stored in the memory of the user device 103, and can be accessed and modified by the user by accessing corresponding application interfaces 120 of the client application 118. In some implementations, the local settings 116 can be transmitted to the primary computing system 104 for storage in the primary user profile 124 of the user. The user, when accessing a client application 118 on a different device, can access the primary computing system 104 using an identifier of the primary user profile 124 (e.g., and login to the primary computing device 104), and synchronize (e.g., download and store) the local settings 116 on the different device.

Figure 3:
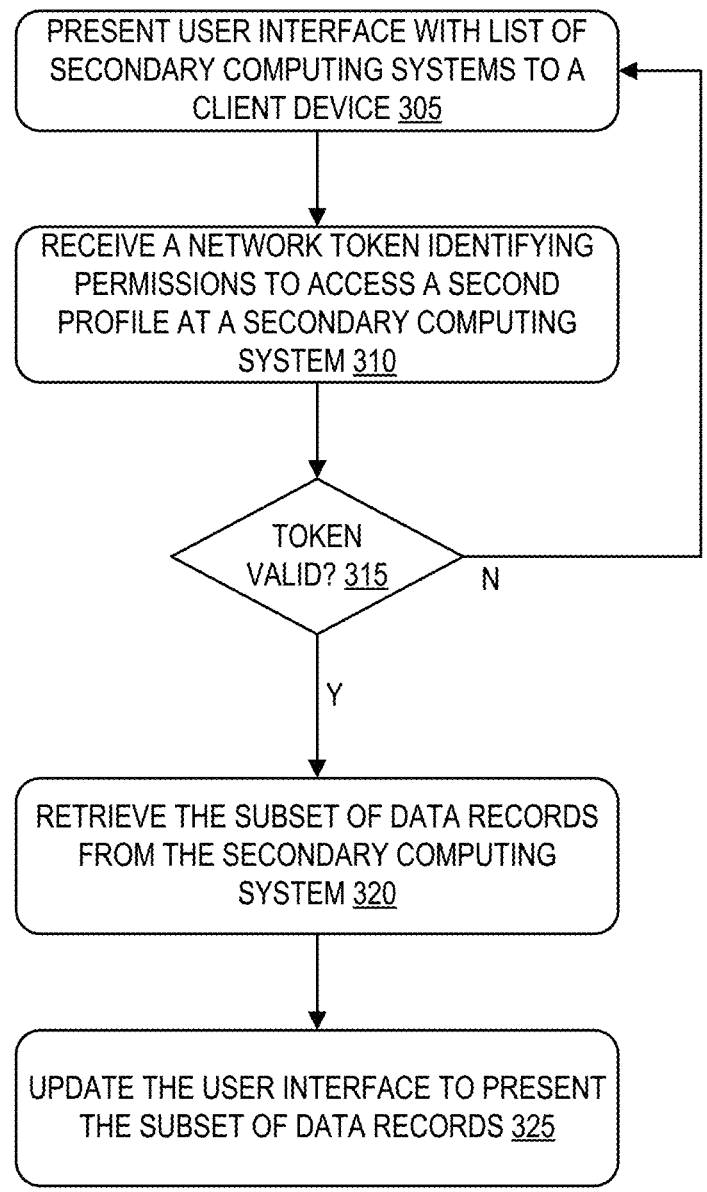
FIG. 3 is a flow diagram of an example method for retrieving information from secondary computing systems using network access tokens, in accordance with one or more example implementations.

Referring to FIG. 3, illustrated is a flow diagram of an example method 300 for retrieving information from secondary computing systems (e.g., the secondary computing systems 102) using network access tokens (e.g., the network tokens 128), in accordance with one or more example implementations. The method 300 can be a computer-implemented method. The method 300 may be implemented, for example, using any of the computing systems described herein, including the primary computing system 104, the secondary computing system 102, the user device 103, or the computing system 700 described in connection with FIG. 7. In some implementations, additional, fewer, and/or different operations may be performed. It will be appreciated that the order or flow of operations indicated by the flow diagrams and arrows with respect to the methods described herein is not meant to be limiting. For example, in one implementation, two or more of the operations of method 300 may be performed simultaneously.

At step 305, the method 300 includes providing a user interface (e.g., an application interface 120) that lists one or more secondary computing systems (e.g., a secondary computing system 102) to a client application (e.g., a client application 118) executing at a client device (e.g., the user device 103) associated with a user profile (e.g., the primary user profile 124) of a primary computing system (the primary computing system 104). Providing the user interface (e.g., an application interface 120) can include transmitting instructions to the client application to display one or more interactive user interface elements, such as the user interface elements described in connection with FIG. 2C. The instructions may include one or more data structures indicating the location, arrangement, or display characteristics of various user interface elements. Some of the user interface elements maybe stored locally at the client device, and the instructions transmitted by the primary computing system can cause the client application to arrange the user interface elements (in this case, the list of secondary computing systems) in an application interface of the client application.

The list of secondary computing systems can be maintained at the primary computing system, or may be indicated or otherwise identified in a primary user profile of the user. As described herein, the user may utilize a primary user profile at the client device to access the functionality of the primary computing system, for example, by performing a login procedure. The primary computing system can receive the login credentials (e.g., username, password, code word, encryption key, etc.) from the client application, and validate the information to identify a user profile. When accessing the client application, the user can select a user interface element to request a list of secondary computing systems. Upon receiving the request, the primary computing system can identify one or more of the secondary computing systems to present to the user in a list. For example, the primary computing system can access a list of secondary computing systems identified in the primary user profile. In some implementations, the primary computing system may access a predetermined list of secondary computing systems. Upon identifying the list of secondary computing systems, the primary computing system can transmit instructions to the client application, which can include a list of identifiers of the secondary computing systems, to display the list in an application interface.

At step 310, the method 300 includes, receiving, from the client device, responsive to detecting a selection of a secondary computing system at the user interface, a network token (e.g., the network token 128) identifying a permission for accessing a second profile maintained at the secondary computing system. When the client application receives the list of secondary computing systems from the primary computing system, the user can select a corresponding user interface element associated with a secondary computing system (e.g., as described above in connection with FIG. 2C) to request generation of a network token. The primary computing system can then transmit instructions to navigate the client application to access a web page or application interface of the secondary computing system. The instructions may include a URI or a URL of a network location, which when requested with suitable communication protocol (e.g., HTTP, HTTPS, FTP, FTPS, or another suitable communication protocol), causes the secondary computing system to transmit instructions to display an application interface for authenticating the user at the secondary computing system. To do so, the secondary computing system, upon receiving the request, can transmit instructions to the client device, which are received by the client application and used to display a login or another type of authentication interface. The client application, although corresponding to the primary computing system, can display the application interfaces of the secondary computing systems described herein, for example, utilizing an application frame. This allows the client application to display information from multiple computing systems with requiring the user to launch separate applications for the secondary computing systems.

The login interface can include one or more fields or user interface elements that accept login information (or allow the user to select a surrogate for login information, such as biometric information, a unique encryption key, two-factor authentication, or any other type of login procedure or combination of procedures, etc.). The client application can accept the login information, which can include an identifier of a secondary profile (e.g., a secondary profile 108) maintained at the secondary computing system, and transmit the login information to the secondary computing system. The secondary computing system can then authenticate the login information by performing an authentication procedure (e.g., identifying the secondary profile based on the identifier in the login information comparing the hash of a password to a stored password hash of the secondary profile, comparing other login information with corresponding login information in the secondary profile to detect a match, etc.). If the login information corresponds to the identified secondary profile, the secondary computing system can transmit a message to the client device indicating that the user has been authenticated to access the secondary computing system using the secondary profile. Otherwise, the secondary computing system can transmit an error message that indicates that the authentication procedure failed, which may provide a further prompt to re-enter the login credentials.

Upon authenticating the login credentials for the secondary profile, the secondary computing system can identify one or more data records (e.g., the data records 112) associated with the secondary profile. The data records can include any type of information associated with the user identified by the secondary profile. For example, the data records can include personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), and financial data (e.g., income, assets, credit score), or other user or account data that is maintained or otherwise accessible to one or more secondary computing systems. The data records can include account information, including payment schedules, account balances, outstanding balances, late payments, overdue payments, transaction histories, records of received payments, or credit limits, among others. Energy consumption information may be reflected, or partially reflected, in the one or more data records. For example, the data records may indicate an amount of energy spent corresponding to one or more transactions, or items owned or purchased by the user, may be included in the data records.

Information about services provided by an entity associated with the secondary computing system can also be indicated in one or more data records. For example, the service information may indicate an amount of bandwidth used (e.g., over a predetermined time period, such as a daily, monthly, or yearly, etc.) as part of an internet service plan (e.g., in the aggregate or on a per-device basis), as part of a cell phone plan (e.g., in the aggregate or on a per-device basis), or another type of data plan. The energy usage information may indicate an estimated value for an amount of power used corresponding to each transaction in a transaction history indicated in the secondary profile. Additionally, the energy usage information can include aggregate statistics, including estimated power usage (e.g., kilowatt-hours, etc.) for a subscription plan (e.g., a streaming video plan, an energy plan, a cell phone data plan, etc.) over a predetermined time period. These values can also be stored in association with a corresponding carbon footprint value, which is also included in one or more data records. The energy usage information may also be included on a per-device basis (e.g., based on screen time or device usage over a predetermined time period, etc.), for usage of electric appliances or electric vehicles, or equivalent energy consumption (and carbon footprint impact) for non-electric appliances or vehicles. The energy consumption information may be stored or otherwise maintained in the data records in both a discrete (e.g., usage-by-usage) basis, and in the aggregate (e.g., groups of devices, services, individually or in combination, over predetermined or user-selectable time periods).

The secondary computing system can then transmit instructions to the client application executing on the client device to present a list of identifiers of data records, each displayed with a corresponding interactive user interface element that indicates whether the respective data record is authorized to be shared with the primary computing system. An example of such an interface is shown in FIG. 2D, which shows a list of data records displayed with a corresponding toggle switch. This application interface can be generated by the secondary computing system, for example, using one or more templates populated with identifiers of the identified data records, and transmitted as display instructions to the client device for display in the client application. Upon making selections at the application interface, an interaction can be performed at the client application that causes the client device to transmit the selections (e.g., identifiers and permissions for which data records that the primary computing system is authorized or not authorized to access) as part of a request for a network token. Additionally, the application interface can include user interface elements that allow a user to specify access rules, such as expiration times, or periods of time that the primary computing system can access the information, or conditions (e.g., time periods, whether an additional login or authentication of the user is required to access one or more data records, etc.) under which the primary computing system can access the information. These access rules can be transmitted to the secondary computing system as part of the request for the network token.

The secondary computing system can update permissions (e.g., the permissions 110 associated with the respective secondary profile) with the selections indicated in the request. Therefore, the permissions can indicate the subset of the data records the user has authorized the primary computing system to access, and the access rules under which the primary computing system can access the subset. In response to the request, the secondary computing system can generate and transmit the network token to the user device (or to the primary computing system). The generated network token can include the encrypted or encoded metadata that indicates the subset of the data records indicated in one or more permissions (e.g., the permissions 110 associated with the corresponding secondary profile 108), which correspond to the user selections in FIG. 2D.

The secondary computing system can generate the network token using one or more encryption techniques. For example, the secondary computing system can utilize a hashing algorithm (e.g., CRC-16, CRC-32, SHA-1, SHA-2, MD5, etc.) or an encryption algorithm (e.g., AES, DES, RSA, etc.) to generate the network token. Generating the network token can include hashing a unique value, such as a timestamp of the request concatenated with an identifier of the secondary profile and/or an identifier of the primary computing system (and in some implementations, further concatenated with an additional salt value). The network token can be generated to include additional encrypted or encoded metadata. For example, after generating the network token using the hash or encryption algorithm, additional metadata (e.g., the permissions indicated by the user in the request) can be encrypted and concatenated with the generated network token. In some implementations, generating the network token itself can include encrypting the permissions selected by the user for the request.

The encryption used for the metadata included in the network token may be symmetric encryption or asymmetric encryption, such that only the secondary computing system can decode or decrypt the encrypted permissions in the network token. For example, the secondary computing system can maintain a private key corresponding to the network token that can be used to decrypt the information included in the network token using a suitable decryption algorithm.

Upon generating the network token, the secondary computing system can transmit the network token to the client device, which can then forward or otherwise provide the network token to the primary computing system. In some implementations, the secondary computing system can transmit the network token directly to the primary computing system without transmitting the network token to the user device. In some implementations, the secondary computing device can generate a secondary decryption key for the network token, which can be used to decrypt a portion of the metadata associated with the network token. For example, information about the expiration date or the access rules for the network token may be encrypted using a secondary key which may also be shared with the primary computing system. This can allow the primary computing to determine whether the network token is still valid, or during what time periods the network token can be used to retrieve information. This provides a benefit to network utilization, as other solutions may require the primary computing system to request validity from the secondary computing system, and therefore require a separate request that may not be authorized by the access rules. In some implementations, the metadata indicating the access rules for the network token (e.g., the expiration date, access schedule, etc.) may be unencrypted and transmitted to the primary computing device with the encrypted network token.

At step 315, the method 300 includes determining that the network token is a valid network token. Upon receiving the network token, the primary computing system can begin attempting to retrieve information from one or more secondary computing systems utilizing the network token. To determine whether information can be retrieved using the network token, the primary computing system can access the metadata associated with the network token (e.g., which may be transmitted to the primary computing system as part of the network token, either as unencrypted data or as data encrypted with a secondary encryption key shared with the primary computing system) that indicates the access rules or expiration date. If current time exceeds the expiration date of the network token, the primary computing system can provide a prompt to the client application indicating that the network token has expired. This can include prompting the user and returning to step 305 of the method 300 to present a list of the secondary computing systems to the user, to allow the user to request a new network token for the secondary computing system.

The primary computing system can further parse the network token to identify an access schedule for the subset of data records stored at the secondary computing device (e.g., which can indicate predetermined time periods that the primary computing system is authorized to access the subset of the data records at the secondary computing system). The primary computing system can compare the current time to the authorized time periods in the access schedule, and if the access schedule indicates the primary computing system is authorized to access the subset, the primary computing system can execute step 320 of the method 300. Otherwise, the primary computing system can wait until the current time falls within an authorized time period indicated in the access rules. In some implementations, the network token can be provided with default access rules, which indicate that the primary computing system can always access the subset of data records. In this case, the primary computing system can simply execute step 320 of the method 300 to retrieve the subset.

At step 320, the method 300 includes retrieving the subset of data records from the secondary computing system according to a retrieval policy (e.g., the access rules). To do so, the primary computing system can transmit a request for data records to the secondary computing system that includes the network token. The primary computing system can transmit the request to a URI or a URL associated with a communication API (e.g., the communication API 114) of the secondary computing system. In some implementations, prior to transmitting the request, the primary computing system can transmit a request to access the communication API. Accessing the communication API may include, for example, a subscription by the primary computing system or other types of prior authorization by the secondary computing system. In response to the request, the secondary computing system can transmit authorization to access the communication API to the primary computing system. The authorization can include, for example, the URI or URL of the communication API, and may also include an access key, a password, or access token that corresponds to the primary computing system that authorizes the primary computing system to access the communication API.

Once the primary computing system is authorized to access the communication API of the secondary computing system (which may only need to occur once for a predetermined time period), the primary computing system can transmit a request for data records to the URL or URI of the communication API of the secondary computing system, which may be referred to herein as an "API call." The API call includes the network token and any additional encrypted or encoded metadata that indicates which of the data records the primary computing system is authorized to access. This additional metadata (sometimes referred to herein as "parameters") can be encrypted at the secondary computing system such that only the secondary computing system can decrypt and access the contents of the metadata (e.g., the list of identifiers, etc.). This enables the primary computing system to make a single, simple API call to the communication API to retrieve only the information authorized by the network token associated with a user. The primary computing system can further improve by transmitting a single batch API call to the communications API, which may include a list or single data blob of several network tokens (and any encrypted or encoded metadata associated with each network tokens). Each of the network tokens in the list can correspond to a respective client device or primary user profile.

If the access rules specified as part of the network token indicate that the data records of the secondary computing system be retrieved periodically, the primary computing system can periodically retrieve the subset of data records from the secondary computing device. Upon receiving the API call (and the network token including encrypted metadata), the secondary computing system can decrypt or decode the encrypted metadata, which then indicates the subset of the data records of a secondary profile that the primary profile is authorized to access. The secondary computing system can then transmit the identified subset of the data records to the primary computing system in a single message, or in several streamed messages forming a single response.

This enables the primary computing system to intelligently aggregate requests for information from a secondary computing system, such that large segments of disparate data from several users can be retrieved in a single API call. This frees up network resources significantly, particularly when the primary computing system must retrieve data associated with several users from several secondary computing systems. If the request is a batch request including several network tokens corresponding to several primary user profiles, the secondary computing system can perform similar operations, and transmit the data records accessed for the several network tokens to the primary computing system in a single message, or in several streamed messages forming a single response as described above. The primary computing system can receive the subset of the data records (or several subsets in the case of a batch request), and stores the information in association with the primary user profile corresponding to the user that requested the network token. Each subset of data records can be stored as retrieved secondary data (e.g., the retrieved secondary data 126) in association with the respective primary user profile.

At step 325, the method 300 includes updating the user interface at the client application to present the subset of data records of the second profile. The client application can communicate with the primary computing system to populate application interfaces with information stored as part of the primary user profile. This information can include the retrieved secondary information that was retrieved from the secondary computing systems in prior method steps. The primary computing system can transmit display instructions to the client application, which cause the client application to display portions of, or all of, the retrieved secondary data in the user interface of the client application. In some implementations, the primary computing system may periodically retrieve additional data records from the secondary computing system on a frequent basis, and update the user interface of the client application in real-time or near real-time as the updated data records are retrieved. If the newly retrieved data records are updated versions of previously stored data records, the primary computing system can replace the previously stored data records with the updated versions. Likewise, in some implementations, the primary computing system can store historical records of the retrieved data, with each retrieved data record stored in association with a timestamp identifying the time of its retrieval.

Using the techniques described herein, the primary computing system can retrieve several different types of data records about a user, and store such information in association with a user profile. This additional information can be utilized by the primary computing system to perform a variety of use cases. For example, once the primary computing system retrieves a predetermined amount of financial information about a user, the primary computing system can calculate a confidence score that indicates the level of confidence that the primary computing system maintains the user's general overall financial information. This confidence score can be calculated, for example, by comparing the number of accounts for which the primary computing system can retrieve information when compared to the accounts reported on a user's credit report.

If the primary computing system can access data records relating to each of the accounts listed on the credit report, the primary computing system can calculate a high confidence level that the user's general overall financial information is maintained at the primary computing system. In contrast, if a credit report of the user is unavailable as part of the user's primary user profile or as part of the retrieved secondary data, or if the credit report indicates several financial accounts that the primary computing system is not authorized to access, the primary computing system can calculate a relatively low score for the user. Calculating the score may be based on a weighted sum of several factors, where the weight values are predetermined values or are calculated based on a predetermined ruleset. The number of financial accounts for which the primary computing system maintains information relative to the number of financial accounts reported in the user's credit report can be one factor. Other factors may include, for example, whether the primary computing system can access transaction histories for one or more financial accounts, whether the primary computing system can access information relating to recurring bills, such as energy, gas, or Internet service provider bills, a number of data records maintained at the primary computing system that cover a period of time, among other factors.

The primary computing system can calculate the confidence score for a primary user profile each time data records are retrieved from one or more secondary computing systems. Upon determining that the confidence score is greater than or equal to a predetermined threshold, the primary computing system can utilize the financial information in the primary user profile and the retrieved secondary data to provide recommendations for retirement products, personal loans, home equity loans, or other financial products. To do so, the primary computing system can determine an amount of available cash flow over time that the user has access to over prospective future pay periods by parsing the data records for deposits and withdrawals to the user's financial accounts. The primary computing system can select loans to recommend to the user that have monthly, semimonthly, or periodic payments that fall within the user's available periodic cash flow. These recommendations can be displayed in application interfaces at the client device, such as the application interface depicted in FIG. 2A.

The primary computing system can also predict when the user may need a loan. For example, the primary computing system can monitor data records relating to credit transactions, and detect when large purchases are made on credit for which there is insufficient funds in other financial accounts used to pay the outstanding balance, and recommend a corresponding loan or financing option to the user via a notification or another application interface. The primary computing system can monitor available cash flow for the user and also monitor upcoming expenses or bills that are due, and recommend a loan to cover a difference between the two, if needed. It will be appreciated that these are simply example use cases, and that the primary computing system may utilize the techniques described herein to provide additional services, product recommendations, or other financing options based on any type of data record retrieved by the primary computing system.

B. Systems and Methods for Generating Environmental Profiles Based on Information Retrieved Using Network Access Tokens Additional use cases for the techniques described in Section A include the generation of environmental profiles based on information retrieved using network access tokens. As described herein above, conventional computing systems that share information utilize several API function calls that are each used to retrieve data that is specific to the API call. Although this may be suitable for small volumes of data for a small number of users, such a solution becomes impracticable to maintain as the number of users, and the types of information retrieved or shared, increases in volume. Information about the parameters and attributes of each API call, as well as the additional code to organize and update each API call for each secondary computing system, utilizes excessive computational resources and reduces overall available network bandwidth.

These difficulties compound when operating with data that is updated frequently or even continuously, such as information relating to an amount of energy consumed by a device. This information may be useful for generating environmental profiles for various users or organizations. Accurate environmental profiles are important to generate, because they can expose drastic inefficiencies in day-to-day operations (e.g., excessive power consumption, etc.) that would otherwise be unmonitored or unnoticed. The accurate environmental profiles described herein rely on up-to-date information from several disparate computing systems. However, simply sharing this information using conventional information transmission or information sharing techniques results in exhausted bandwidth and excessive use of computational resources. Generating accurate environmental profiles becomes impracticable to maintain when the number of devices being monitored, and the number of users or organizations being monitored, increases in magnitude.

In an example use case, a primary computing system can implement the present techniques to generate an environmental profile for a user from information gathered from a number of secondary computing systems. Energy consumption data from the secondary computing systems that make up the environmental profile can be accessed by a user via a client application executed on a user device of the user. The user device may be a smart phone, a laptop, or another type of computing system capable of communicating with the primary computing system and the secondary computing systems. The environmental profile may include any information from the secondary computing systems that are authorized by the user via the user device. The user device can communicate with the primary computing system and the secondary computing systems to generate network tokens, which can be used by the primary computing system to access and synchronize specific information (authorized by the user) at the secondary computing systems. The primary computing system can synchronize energy consumption data from the secondary computing systems using one or more network tokens to update the environmental profile for the user. Additionally, the primary user profile can generate additional metrics, such as carbon footprint or energy consumption metrics, based on records of activity stored retrieved from the secondary computing systems. The environmental profile can be presented in one or more user interfaces at the user device, or utilized in various additional processing operations as described herein.

Figure 4:
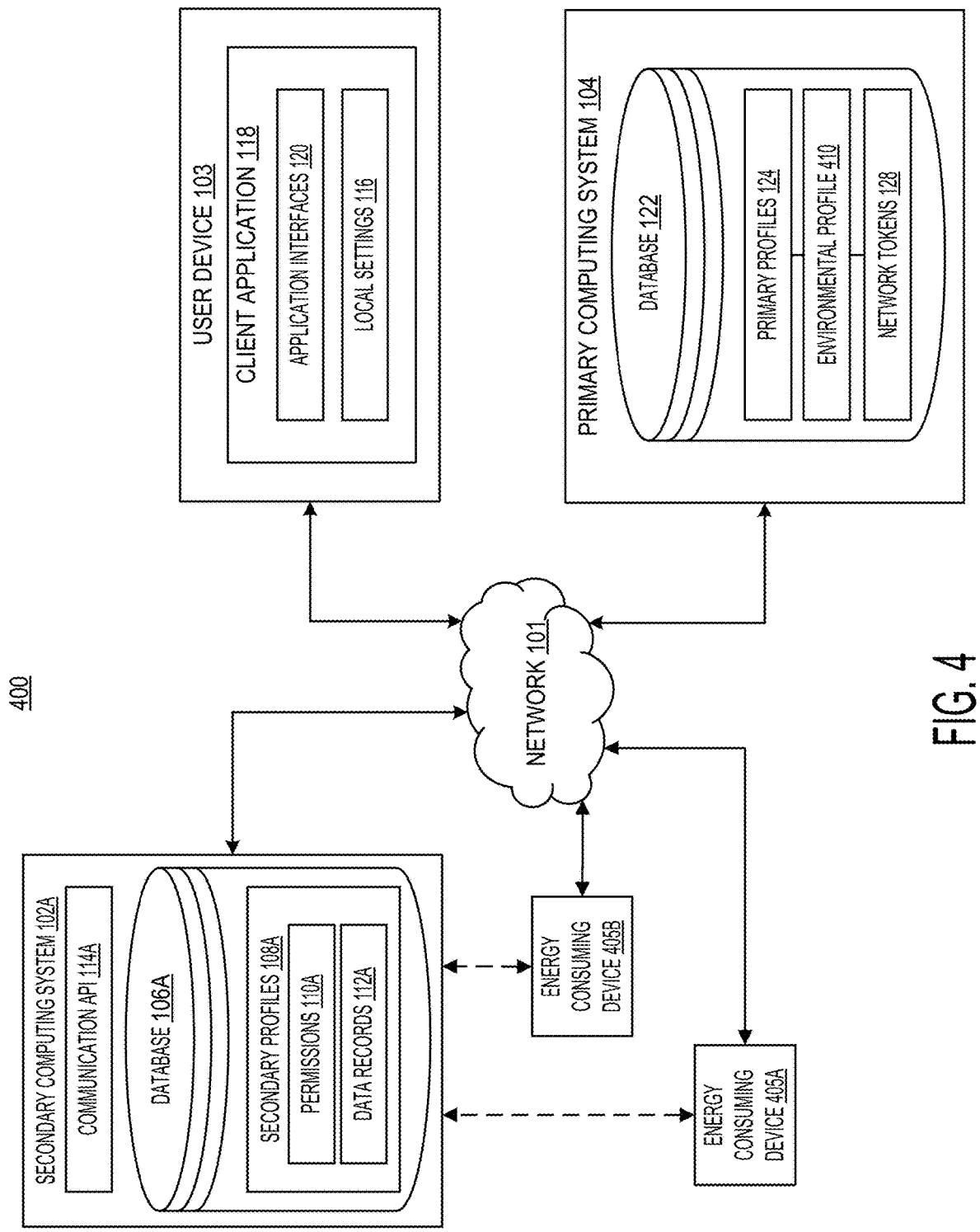
FIG. 4 is a block diagram of an example system for generating environmental profiles based on information retrieved using network access tokens, in accordance with one or more example implementations.

FIG. 4 is a block diagram of an example system 400 for generating environmental profile 410s based on information retrieved using network access tokens, in accordance with one or more example implementations. The system 400 can be similar to the system 100 described herein in connection with FIG. 1, and include the same components and computing systems. For example, the system 400 may include at least one secondary computing system 102A (more than one secondary computing system 102 may be utilized, but is omitted here for visual clarity), one or more user devices 103 (which may include multiple computing devices of one or more users in one or more locations), one or more primary computing systems 104. Each of the secondary computing systems 102, the primary computing system 104, and the user device(s) 103 can be in communication with one another via the network 101, as described in connection with FIG. 1. Additionally, the system 400 can include energy consuming devices 405A and 405B (which may sometimes be referred to as "energy consuming device(s) 405").

Each energy consuming device 405 can include at least one processor and a memory (e.g., a processing circuit). The memory can store processor-executable instructions that, when executed by processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. Each energy consuming device 405 can include any or all of the components and perform any or all of the functions of the computer system 700 described herein in conjunction with FIG. 7.

The energy consuming devices 405 can be any type of device that is capable of consuming energy, and providing records or data relating to an amount of energy consumed by the device to another computing system. In some implementations, the energy consuming devices 405 may be "smart" devices, or network-enabled devices, which can communicate energy usage information to one or more corresponding secondary computing systems 102 via the network 102. In some implementations, one or more energy consuming devices 405 can be communicatively coupled to the secondary computing system 102 and can transmit indications of energy consumption through a communications interface other than the network 101. The energy consuming devices 405 can be an energy reporting device, which is a network-enabled device that can monitor and report energy consumption from conventional "dumb" devices that would otherwise be unable to monitor their energy consumption or report the energy consumption information to another computing device. For example, the energy consuming devices 405 can be a smart plug or a smart surge protector device. The energy consuming devices 405 may include an electric vehicle, an electric appliance, or any other type of device capable of utilizing energy. In some implementations, the energy consuming devices 405 may be devices that report activity, such as indications of driving activity from a non-electric vehicle, indications of flights undertaken by an airplane, or other types of non-electrical energy consuming activities that have an impact on the environment.

The energy consuming devices 405 can report any type of energy consuming information, or information relating to energy-consuming activity, to one or more secondary computing systems 102 that are associated with the energy consuming devices 405. In some implementations, the secondary computing system 102 can communicate with multiple energy consuming devices 405, and can record energy consumption information received from each energy consuming device 405 in one or more data records 112 of a secondary profile 108 associated with a user (or owner) of the energy consuming device 405. For example, each energy consuming device 405 can transmit an identifier of a secondary profile 108 (which may be preconfigured by a user) to the secondary computing system 102, such that the secondary computing system can properly store energy consumption information in the secondary profile 108 for that user.

The data records 112 indicating energy consumption information can be updated or created by the secondary computing system 102 in response to receiving a message from an energy consuming device 405. The messages can include energy consumption information, which can indicate an amount of energy (e.g., watts, kilowatt-hours, voltage, current, other electric or energy-related operating characteristics, etc.) of the energy consuming device 405. Each energy consuming device can include a voltage monitoring device, a current monitoring device, or a power monitoring device, which can monitor the amount of power consumed by the energy consuming device 405 (or in the case where the energy consuming device is a smart plug or a smart power strip, the energy consuming device 405 can monitor power from an external "dumb" device electrically coupled to the energy consuming device 405).

The power values monitored by the energy consuming devices 405 can be recorded locally in a memory of the energy consuming device. Then, the locally recorded values can be transmitted to the secondary computing system 102 associated with the energy consuming device 405, for example, when the local memory is full or reaches a predetermined storage level. The local recording of the data may be deleted upon transmission to the secondary computing system 102 to make space for newly monitored power values. The power consumption of the energy consuming device can be monitored on a periodic basis. In some implementations, the energy consuming device 405 can periodically transmit energy consumption data to the secondary computing system 102, or in response to a synchronization request from the secondary computing system 102.

The secondary computing system 102 can receive the messages including the power consumption information from the energy consuming devices 405, and store the power consumption information in one or more data records 112 in the secondary profile 108. The data records 112 indicating the power consumption information may be indexed on a per-device or a per-user basis. In some implementations, the secondary computing system 102 can receive indications of online activity or offline activity from other computing systems via the network 101. For example, the secondary computing systems 102 may receive an indication that a user associated with a secondary profile 108 has taken a flight, and record the characteristics of the flight in one or more data records 112. The indication may be, for example, a transaction record of the flight, and the flight can indicate a duration of the flight, take-off and landing locations, or layover information. Additionally, information relating to online activities, such as purchases, interactions, or view of web pages can be stored in one or more data records 112 of a secondary profile associated with the user performing the online activities. The information in the data records 112 can be utilized by the primary computing system 104 to generate an environmental profile 410, as described herein in connection with FIG. 6.

The primary computing system 104 can provide one or more application interfaces 120 to a user device 103, as described in connection with Section A. In addition to providing application interfaces 120 showing the retrieved secondary data 126 as described in connection with FIG. 1 and FIGS. 2A-2E, the primary computing system 104 can provide application interfaces 120 that show information relating to the generation of an environmental profile 410 for the user. The environmental profile 410 can be generated using the techniques described in connection with FIG. 6. Some examples of application interfaces 120 that show information relating to environmental profiles is described in connection with FIGS. 5A-5E.

Figure 5A:
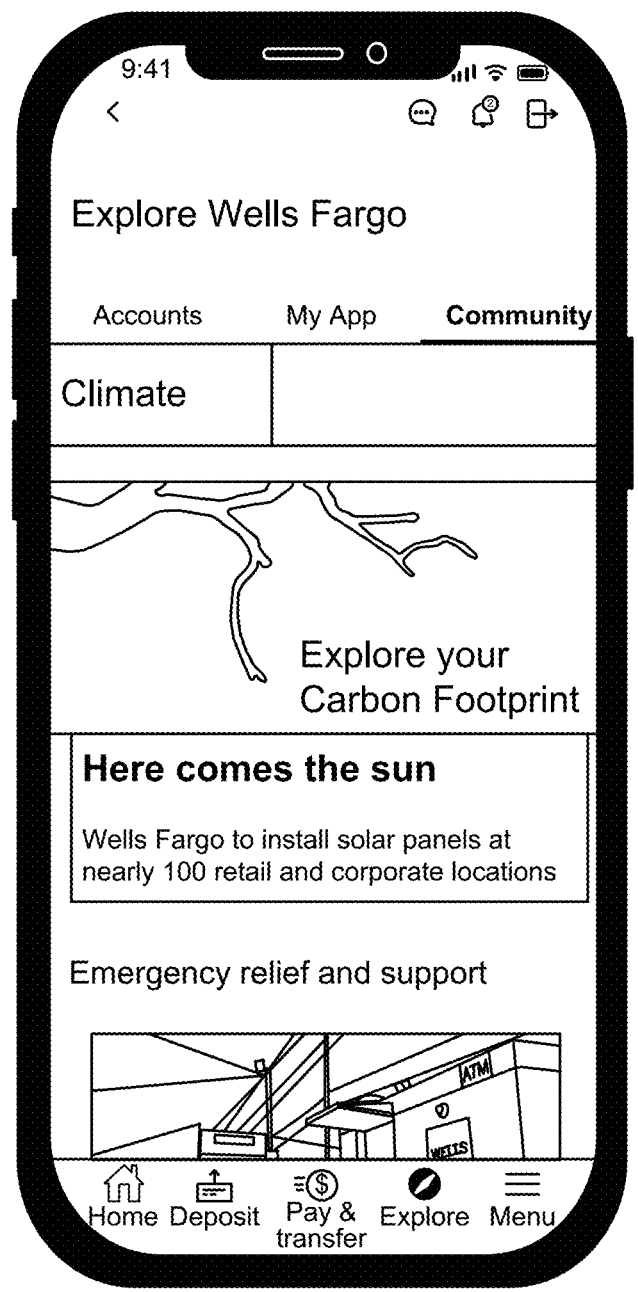
FIGS. 5A, 5B, 5C, 5D, and 5E depict example views of a client application that communicates with and facilitates performance some of the techniques described in connection with FIG. 4, in accordance with one or more example implementations.

Referring to FIG. 5A, illustrated is an example application interface 500A, which displays an example notification indicating that the user can generate an environmental profile. As shown, the notification may appear as part of the client application 118 described in greater detail in connection with FIG. 1. The notification may be stored as part of the primary user profile 124, and displayed when the user accesses an application interface 120 corresponding to the primary computing system 104 using the client application 118. The notification can be provided, for example, when the client application 118 is navigated to an application interface 120 relating to environmental profiles. As shown here, this application interface 120 is shown as "Community."

Figure 5B:
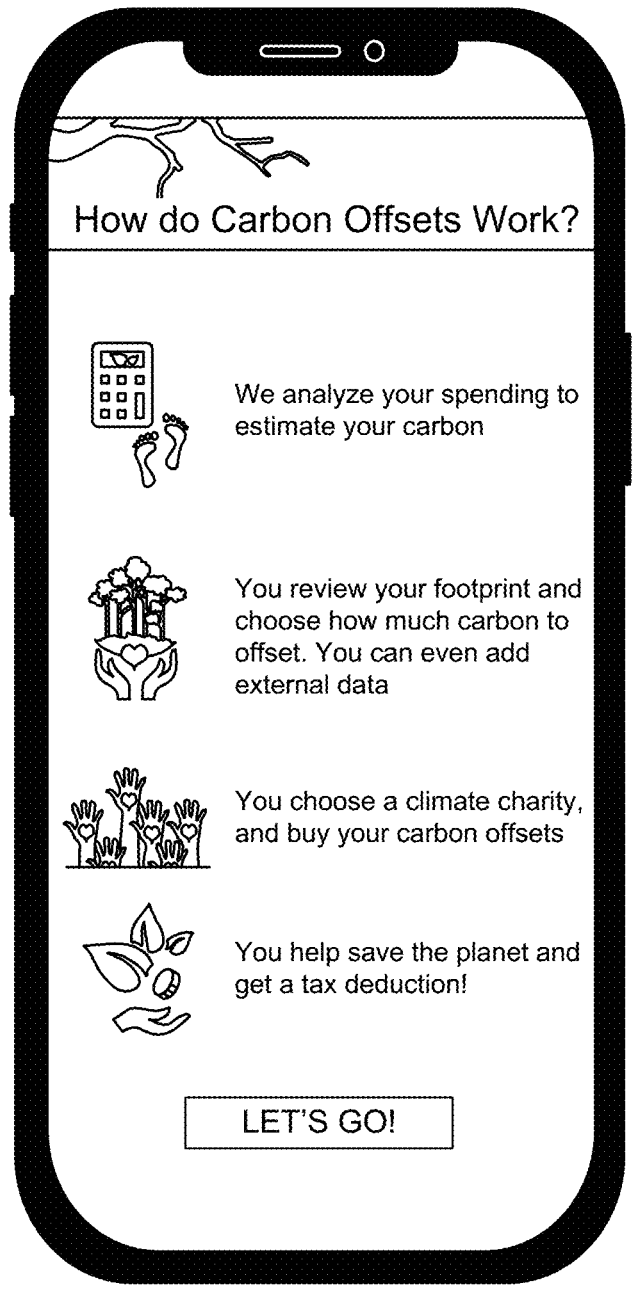

Upon detecting an interaction with the notification, the client application 118 can navigate to another application interface that provides information about generating environmental profiles, which can include an interactive user interface element that allows the user to request generation of an environmental profile 410. An example of such an application interface is shown in FIG. 5B. Referring briefly to FIG. 5B, illustrated is an example application interface 500B that includes information relating to an environmental profile 410 and an interactive user interface element (shown here as a button labeled "LET'S GO!") that causes the user device 103 to request generation of an environmental profile 410. Once the environmental profile 410 has been generated by the primary computing system using the techniques described in connection with FIG. 6, the primary computing system can provide one or more application interfaces 120 that include information (e.g., requested information, overview information, information corresponding to predetermined time periods, etc.) from the environmental profile 410 to the user device 103.

Figure 5C:

Referring to FIG. 5C, illustrated is an example application interface 500C showing information included in the environmental profile 410. The environmental profile 410 can include information relating to a carbon footprint of the user, and can indicate power consumption information by each energy consuming device 405 and each online or offline activity retrieved from data records 112 at the secondary computing system 102. The carbon footprint or energy consumption information can be estimated by the primary computing system 104 for each online or offline activity, for example, based on information stored in look-up tables. The look-up tables can include information relating to each activity, and an amount of energy consumption per unit time or per-unit spend (e.g., a predetermined dollar amount, etc.).

Figure 5D:
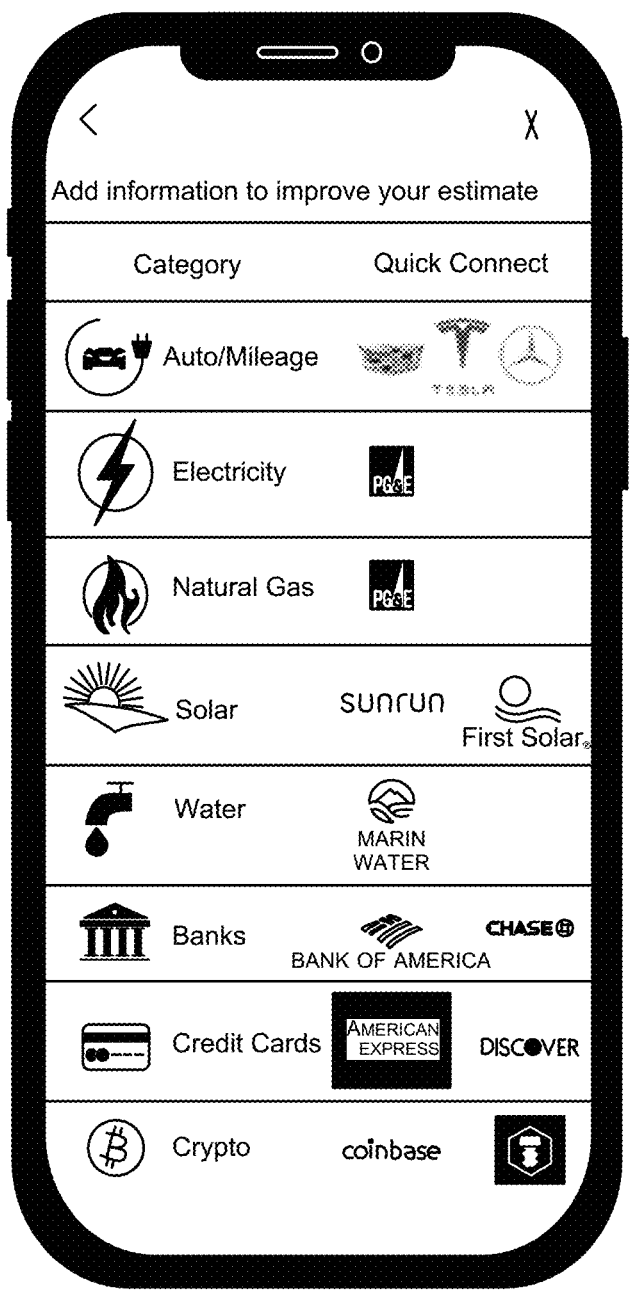

Network tokens 128 for additional sources of energy consumption data (e.g., additional secondary computing systems 102) can be generated in response to requests from the user device 103. Referring to FIG. 5D, illustrated is an example application interface 500D that shows a series of interactive user interface elements that that, when selected, cause the user device 103 to perform operations described in connection with Section A to request a network token 128 from a corresponding secondary computing system. The application interface 500D can be similar to the application interface 200C described in connection with FIG. 2C, in that a number of different possible selections are presented to the user at the user device 405. The generated network tokens 128 can authorize the primary computing system 104 to access data records 112 that store information relating to the energy consumption information of one or more energy consuming devices 405 owned, operated, or otherwise associated with the requesting user.

Figure 5E:
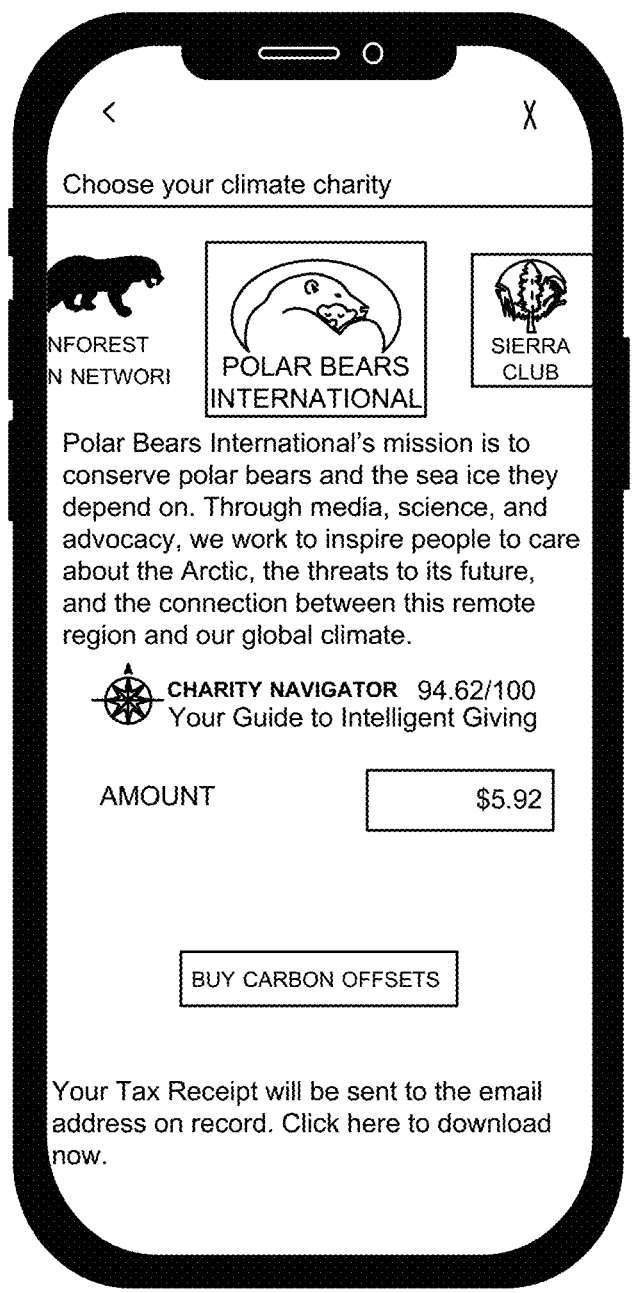

Upon retrieving the data records 112 and generating the environmental profile 410 for the user, the primary computing system 104 can provide one or more recommendations to the user via an application interface 120. Referring to FIG. 5E, illustrated is an example application interface 500E that allows the user to contribute to charities, for example, to receive reductions in taxes according to their contributions and their environmental profile. As shown, the application interface 500E includes a field that allows the user to enter a contribution amount. When the user selects the "BUY CARBON OFFSETS" button on the application interface 500E, the user device 103 can transmit a signal to the primary computing system 104 to complete a transaction to purchase carbon offsets according to the amount entered in the field. Various charities or organizations can be recommended to the user based on the carbon footprint value calculated as part of the environmental profile 410, which is generated using the techniques described in connection with FIG. 6.

Figure 6:
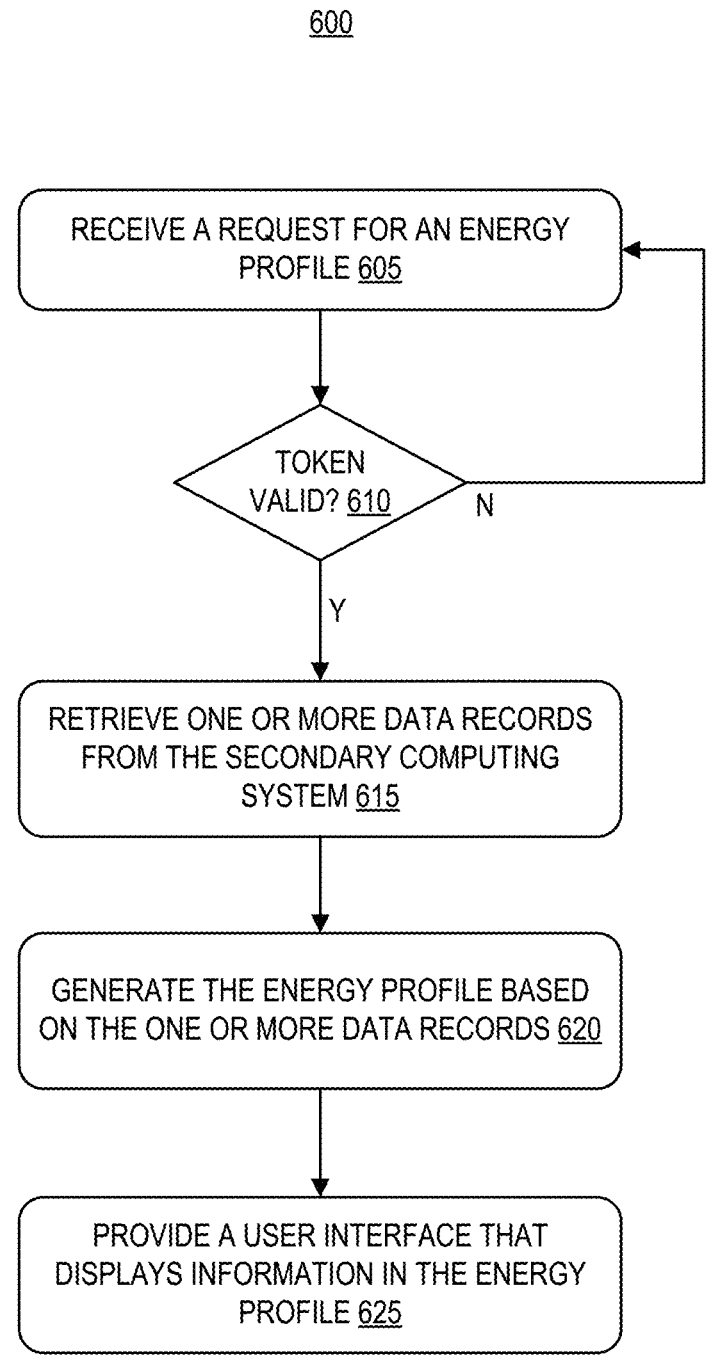
FIG. 6 is a flow diagram of an example method for generating environmental profiles based on information retrieved using network access tokens, in accordance with one or more example implementations.

Referring to FIG. 6, illustrated is a flow diagram of an example method 600 for generating environmental profiles (e.g., the environmental profiles 410) based on information retrieved using network access tokens (e.g., the network tokens 128), in accordance with one or more example implementations. The method 600 can be a computer-implemented method. The method 600 may be implemented, for example, using any of the computing systems described herein, including the primary computing system 104, the secondary computing system 102, the user device 103, or the computing system 700 described in connection with FIG. 7. In some implementations, additional, fewer, and/or different operations may be performed. It will be appreciated that the order or flow of operations indicated by the flow diagrams and arrows with respect to the methods described herein is not meant to be limiting. For example, in one implementation, two or more of the operations of method 600 may be performed simultaneously.

At step 605, the method 600 includes receiving, from a client device (e.g., the user device 103), a request for an energy profile (e.g., the environmental profile 410) generated based on one or more data records (e.g., the data records 112) maintained by at least one secondary computing system (e.g., the secondary computing system 102). The request can include at least one network token 128 corresponding to the at least one secondary computing system, which may be generated using the techniques described in connection with Section A. The request can be transmitted in response to a selection of an interactive user interface element at an application interface, such as the application interface 500B described in connection with FIG. 5B. The primary computing system can provide instructions to the client device to display the application interface as part of a client application. The instructions may include one or more data structures indicating the location, arrangement, or display characteristics of various user interface elements. Some of the user interface elements maybe stored locally at the client device, and the instructions transmitted by the primary computing system can cause the client application to arrange the user interface elements (in this case, the list of secondary computing systems) in an application interface of the client application.

The client application executing on the client device can be a web-based or native application that communicates with the primary computing system. The application interfaces provided by the primary computing system can be displayed in the client application, for example, in an application frame. In some implementations, the primary computing system can provide a list of secondary computing systems from which the data records can be accessed, as described herein above in connection with Section A. To access the features of the primary computing system, and prior to transmitting the request, the client application can login to the primary computing system via one or more authentication or login interfaces.

Prior to requesting the environmental profile, the client device can request one or more network tokens from one or more secondary computing systems at which the user has one or more secondary accounts (e.g., the secondary profiles 108). The secondary computing systems can generate the network tokens as described in connection with Section A, and provide the network tokens to the client device, which can store the tokens in local memory. The client device can then transmit the network tokens to the primary computing system separately, as they are provided to the client device, or as part of the request for the environmental profile. As described herein, the primary computing system can utilize the network tokens to access information at the secondary computing systems stored in the data records associated with the user's secondary profiles.

At step 610, the method 500 includes determining that the network token is a valid network token that permits access to the one or more data records maintained by the at least one secondary computing system. Upon receiving the network token, the primary computing system can begin attempting to retrieve information from one or more secondary computing systems utilizing the network token. To determine whether information can be retrieved using the network token, the primary computing system can access metadata associated with the network token (e.g., which may be transmitted to the primary computing system as part of the network token, either as unencrypted data or as data encrypted with a secondary encryption key shared with the primary computing system) that indicates the access rules or expiration date. If current time exceeds the expiration date of the network token, the primary computing system can provide a prompt to the client application indicating that the network token has expired. This can include prompting the user to request a new network token for the associated secondary computing system. In some implementations, the primary computing system can transmit instructions to the client application to present a list of secondary computing systems to the user, to allow the user to request a new network token for one or more secondary computing systems.

The primary computing system can further parse the network token to identify an access schedule for one or more of the data records stored at the secondary computing system (e.g., which can indicate predetermined time periods that the primary computing system is authorized to access the subset of the data records at the secondary computing system). The primary computing system can compare the current time to the authorized time periods in the access schedule, and if the access schedule indicates the primary computing system is authorized to access the data records, the primary computing system can execute step 615 of the method 600. Otherwise, the primary computing system can wait until the current time falls within an authorized time period indicated in the access rules. In some implementations, the network token can be provided with default access rules, which indicate that the primary computing system can always access the data records. In this case, the primary computing system can simply execute step 615 of the method 300 to retrieve one or more of the data records relating to the energy consumption data.

At step 615, the method 600 includes retrieving the one or more data records from the secondary computing system using the network token. To do so, the primary computing system can transmit a request for data records to the secondary computing system that includes the network token.

The primary computing system can transmit the request to a URI or a URL associated with a communication API (e.g., the communication API 114) of the secondary computing system. In some implementations, prior to transmitting the request, the primary computing system can transmit a request to access the communication API. Accessing the communication API may include, for example, a subscription by the primary computing system or other types of prior authorization by the secondary computing system. In response to the request, the secondary computing system can transmit authorization to access the communication API to the primary computing system. The authorization can include, for example, the URI or URL of the communication API, and may also include an access key, a password, or access token that corresponds to the primary computing system that authorizes the primary computing system to access the communication API.

Once the primary computing system is authorized to access the communication API of the secondary computing system (which may only need to occur once for a predetermined time period), the primary computing system can transmit a request for data records to the URL or URI of the communication API of the secondary computing system as part of an API call. The API call includes the network token and any additional encrypted or encoded metadata that indicates which of the data records the primary computing system is authorized to access. This additional metadata (sometimes referred to herein as "parameters") can be encrypted at the secondary computing system such that only the secondary computing system can decrypt and access the contents of the metadata (e.g., the list of identifiers, etc.). This enables the primary computing system to make a single, simple API call to the communication API to retrieve only the information authorized by the network token associated with a user. The primary computing system can further improve by transmitting a single batch API call to the communications API, which may include a list or single data blob of several network tokens (and any encrypted or encoded metadata associated with each network tokens). Each of the network tokens in the list can correspond to a respective client device or primary user profile.

If the access rules specified as part of the network token indicate that the data records of the secondary computing system be retrieved periodically, the primary computing system can periodically retrieve the subset of data records from the secondary computing device. Upon receiving the API call (and the network token including encrypted metadata), the secondary computing system can decrypt or decode the encrypted metadata, which then indicates the subset of the data records of a secondary profile that the primary profile is authorized to access. The secondary computing system can then transmit the identified subset of the data records to the primary computing system in a single message, or in several streamed messages forming a single response.

One or more of the data records in the secondary profiles maintained at the secondary computing systems can identify a respective device (e.g., an energy consuming device 405) and a respective energy usage value for that device. The energy usage value can be stored in association with a respective identifier of the energy consuming device, and timestamps corresponding to the time period to which the power consumption value corresponds. The power consumption values can be any type of information that indicates an amount of power consumed (e.g., watts, kilowatt-hours, voltage, current, etc.). In some implementations, the energy data in the data record may be raw voltage, current, or wattage values, and a kilowatt-hour or other power-time value can be calculated by the primary computing system using the raw voltage, current, or wattage values and the timestamp. Additionally, one or more of the data records can identify online or offline activity performed by the user while utilizing the user's secondary profile. Such data records can include an activity metric, which can correspond to a magnitude (e.g., an amount of environmental impact) corresponding to that activity.

Data records indicating such activities can include transaction records, records of taxi rides, driving records, or other offline activities that have an environmental impact. In some implementations, offline activities are identified in a transaction record stored in a data record at the secondary computing system. Additionally, information relating to online activities, such as purchases, interactions, or view of web pages can be stored in one or more data records of the secondary profile associated with the user. Although the processes described herein have been described as retrieving records from a single secondary computing system, it should be understood that the primary computing system can retrieve data records from several secondary computing systems, each of which may maintain different data records corresponding to different energy consuming devices, offline activities, or online activities. The primary computing system can access these data records, for example, in response to one or more requests from the user device 103 to generate or update an environmental profile.

At step 620, the method 600 includes generating the energy profile (e.g., the environmental profile 410, sometimes referred to herein as an "environmental profile") based on the one or more data records retrieved from the secondary computing system. The environmental profile can be generated by parsing the energy consumption records in each data record accessed from the secondary computing systems. The primary computing system can calculate overall energy consumption for all energy consuming devices over several predetermined time periods, for example, on a daily basis, a weekly basis, a monthly basis, or a yearly basis, among others. The primary computing system can store the overall energy consumption for each of these time periods as part of the environmental profile. Additionally, for each time period, the primary computing system can store corresponding contribution values for each energy consuming device over that time period (e.g., by adding up the energy consumed by that device over the respective time period, as indicated in the time stamps in the data records). The primary computing system can store this information indexed by the device identifier, the time period, or a combination of the device identifier and the time period, as part of the environmental profile.

The primary computing system can also estimate a corresponding energy consumption values for different offline or online activities for which an actual energy consumption value is unavailable. Some examples of such activities can include traveling (indications of which may be extracted from one or more transaction records). The primary computing system can calculate the estimated energy consumption for the offline activity, for example, using one or more lookup tables or estimation algorithms. For travel, the estimation can be calculated based on the mode of travel (e.g., flying, boat, train, car, public transport, etc.), the distance traveled, and the amount of time it took to travel the distance, among others. Additionally, the primary computing system can estimate an energy consumption value for items that are purchased. For example, the primary computing system can maintain a database or lookup table for products, which are stored in association with an estimated energy consumption value that reflects the amount of energy used to produce the product. The primary computing system can parse the data records to extract one or more transaction records for goods or services, and can perform a lookup in the table to extract an amount of energy consumed by producing the good or service. The magnitude or activity metric of the purchase can correspond to the amount spent on the purchase, the amount spent on the service, or a number of items purchased, among others.

The primary computing system can determine at least one carbon footprint value based on one or more data records of the one or more data records, as part of the environmental profile. In addition to determining the amount of the transaction, the primary computing system can estimate an overall carbon footprint for each energy consuming device, online activity, or offline activity, for each time period in the environmental profile. To estimate the carbon footprint, the primary computing system may utilize a carbon footprint estimation algorithm. The algorithm may utilize, for example, the calculated energy consumption value, a location of the user, or information relating the source of power for each of the energy consuming devices or activities.

For flights or other travel, the primary computing system may utilize predetermined or maintained information in a lookup table indexed by the model of travel. For each mode of travel, the carbon footprint can generally scale with the distance or time of the trip. For the energy consuming devices, the primary computing system can identify a source of power for each energy consuming device, and access a corresponding factor (e.g., a translation factor) by which to multiple the energy consumption value for that energy consuming device to calculate the carbon footprint value. Lookup tables may also be used. Similar techniques (e.g., lookup tables, translation factors, etc.) may also be used to calculate the carbon footprint value for offline and online activities. Once calculated, the primary computing system can store the carbon footprint values in the aggregate for each time period, and also indexed by each device or activity. This allows the primary computing system to present the energy consumption values and the carbon footprint values to the user on a per-time period, a per-device, or a per-activity basis.

At step 625, the method 600 can include providing, by the primary computing system for presentation at the client device, a user interface that displays information in the energy profile. The client application can communicate with the primary computing system to populate application interfaces with the information retrieved and used to generate the environmental profile. In response, the primary computing system can transmit display instructions to the client application, which cause the client application to display requested portions of, or all of, the environmental profile in the user interface of the client application. In some implementations, the primary computing system may periodically retrieve additional data records from the secondary computing system on a frequent basis, and update the environmental profile accordingly using the techniques described herein. Upon doing so, the primary computing system can update the user interface of the client application in real-time or near real-time as the environmental profile is updated. The user can interact with the client application to access energy consumption values or other values on a per-device, per-activity, or per-time period basis, for example, by sending corresponding requests to the primary computing system. In response, the primary computing system can transmit the requested information to the client application for display.

Using the techniques described herein, the primary computing system can retrieve several different types of data records about a user, and utilize these data records to generate an environmental profile for a user. Upon generating a environmental profile that covers a predetermined period of time (e.g., one year, etc.), the primary computing system can utilize the carbon footprint information or the energy consumption information in the environmental profile to provide recommendations for contributions that offset the emissions produced by the user. To do so, the primary computing system can identify the amount of carbon emissions produced by the user's devices or activities over a predetermined time period (e.g., one year). The primary computing system can then select carbon footprint offset offers that can offset the weekly, monthly, or yearly carbon emissions produced by the user. These recommendations can be displayed in application interfaces at the client device, such as the application interface depicted in FIG. 5E.

Figure 7:
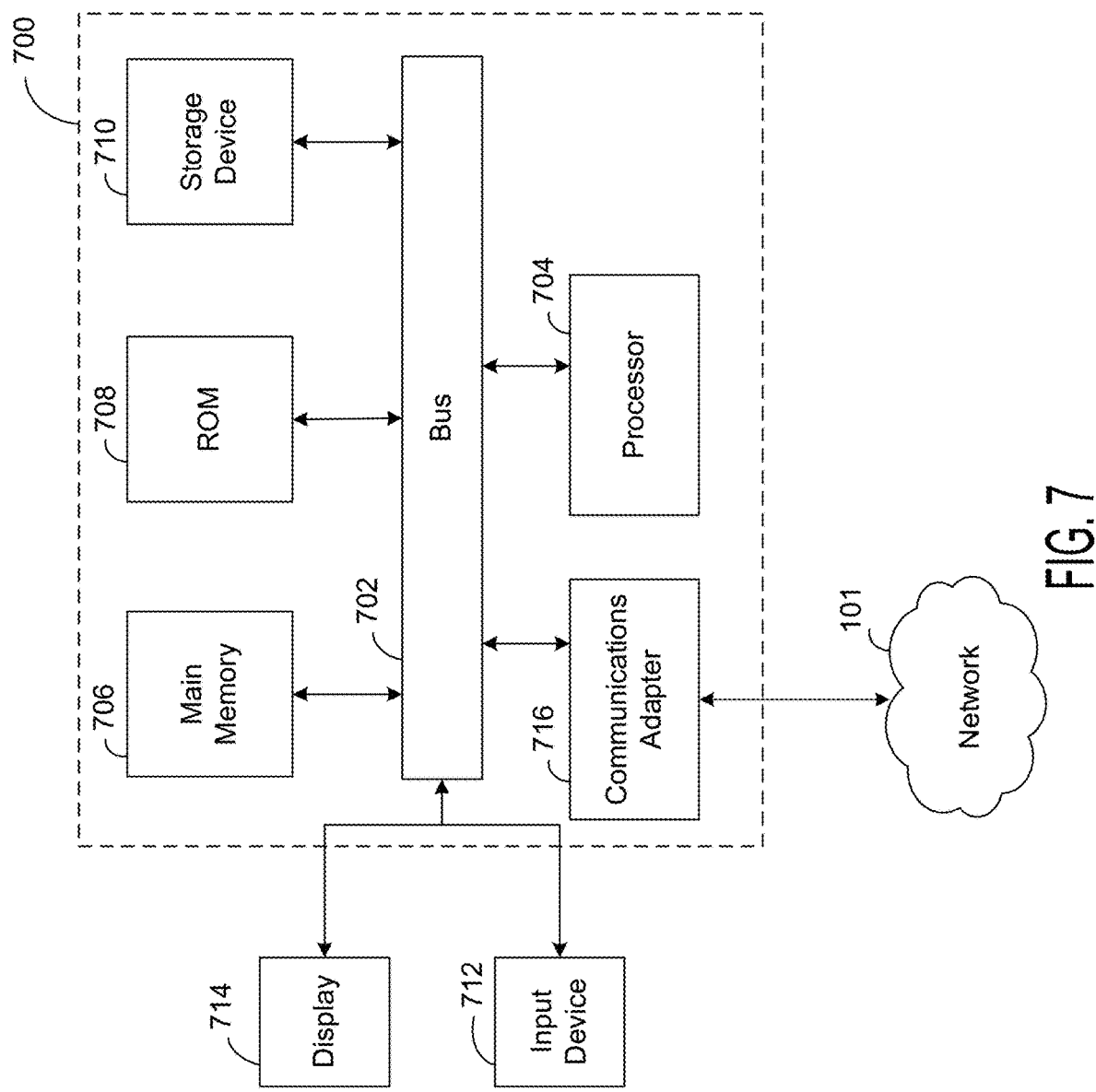
FIG. 7 is a component diagram of an example computing system suitable for use in the various arrangements described herein, in accordance with one or more example implementations.

C. Systems and Methods for Generating Environmental Profiles Based on Information Retrieved Using Network Access Tokens FIG. 7 is a component diagram of an example computing system suitable for use in the various implementations described herein, according to an example implementation. For example, the computing system 700 may implement an example unaffiliated computing system 102, user device 103, primary computing system 104, and/or various other example systems and devices described in the present disclosure.

The computing system 700 includes a bus 702 or other communication component for communicating information and a processor 704 coupled to the bus 702 for processing information. The computing system 700 also includes main memory 706, such as a random access memory (RAM) or other dynamic storage device, coupled to the bus 702 for storing information, and instructions to be executed by the processor 704. Main memory 706 can also be used for storing position information, temporary variables, or other intermediate information during execution of instructions by the processor 704. The computing system 700 may further include a read only memory (ROM) 708 or other static storage device coupled to the bus 702 for storing static information and instructions for the processor 704. A storage device 710, such as a solid state device, magnetic disk, or optical disk, is coupled to the bus 702 for persistently storing information and instructions.

The computing system 700 may be coupled via the bus 702 to a display 714, such as a liquid crystal display, or active matrix display, for displaying information to a user. An input device 712, such as a keyboard including alphanumeric and other keys, may be coupled to the bus 702 for communicating information, and command selections to the processor 704. In another implementation, the input device 712 has a touch screen display. The input device 712 can include any type of biometric sensor, a cursor control, such as a mouse, a trackball, or cursor direction keys, for communicating direction information and command selections to the processor 704 and for controlling cursor movement on the display 714.

In some implementations, the computing system 700 may include a communications adapter 716, such as a networking adapter. Communications adapter 716 may be coupled to bus 702 and may be configured to enable communications with a computing or communications network 101 and/or other computing systems. In various illustrative implementations, any type of networking configuration may be achieved using communications adapter 716, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes that effectuate illustrative implementations that are described herein can be achieved by the computing system 700 in response to the processor 704 executing an implementation of instructions contained in main memory 706. Such instructions can be read into main memory 706 from another computer-readable medium, such as the storage device 710. Execution of the implementation of instructions contained in main memory 706 causes the computing system 700 to perform the illustrative processes described herein. One or more processors in a multi-processing implementation may also be employed to execute the instructions contained in main memory 706. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, ASICs, FPGAs, digital signal processors (DSPs), or other suitable electronic data processing components structured to execute instructions provided by memory. The one or more processors may take the form of a single core processor, multi-core processor (e.g., a dual core processor, triple core processor, and/or quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method, comprising:
providing, by a primary computing system, a user interface that lists a plurality of secondary computing systems to a client application corresponding to the primary computing system and executing at a client device associated with a user profile of the primary computing system;
responsive to detecting a selection of a secondary computing system of the plurality of secondary computing systems at the user interface, receiving, by the primary computing system from the client device, a network token identifying a permission for accessing a second profile maintained at the secondary computing system;
parsing, by the primary computing system, the network token to determine an access schedule for accessing a subset of data records of the second profile maintained at the secondary computing system;
retrieving, by the primary computing system, using the network token, the subset of data records from the secondary computing system according to the access schedule; and
updating, by the primary computing system, the user interface at the client application to present the subset of data records of the second profile.

2. The method of claim 1, further comprising receiving, by the primary computing system from the secondary computing system, authorization to access an application programming interface (API) of the secondary computing system.

3. The method of claim 2, wherein the subset of data records are retrieved using the API of the secondary computing system.

4. The method of claim 1, further comprising parsing the network token received from the client device.

5. The method of claim 1, further comprising updating, by the primary computing system, the user profile based on the subset of data records of the second profile.

6. The method of claim 1, wherein the network token indicates that the subset of data records can be accessed periodically, and wherein retrieving the subset of data records from the secondary computing system comprises periodically retrieving the subset of data records from the secondary computing system.

7. The method of claim 1, wherein retrieving the subset of data records from the secondary computing system comprises performing a single API call using the API of the secondary computing system.

8. The method of claim 7, wherein the single API call comprises one or more parameters identified in the network token.

9. The method of claim 1, wherein the network token comprises an expiration time stamp, and further comprising providing, by the primary computing system, a prompt to the client application indicating that the network token has expired responsive when a current time exceeds the expiration time stamp.

10. A system, comprising:
a primary computing system comprising one or more processors coupled to a non-transitory memory, the one or more processors configured to:
provide a user interface that lists a plurality of secondary computing systems to a client application corresponding to the primary computing system and executing at a client device associated with a user profile of the primary computing system;
receive, from the client device responsive to detecting a selection of a secondary computing system of the plurality of secondary computing systems at the user interface, a network token identifying a permission for accessing a second profile maintained at the secondary computing system;
parse the network token to determine an access schedule for accessing a subset of data records of the second profile maintained at the secondary computing system;
retrieve, using the network token, the subset of data records from the secondary computing system according to the access schedule; and
update the user interface at the client application to present the subset of data records of the second profile.

11. The system of claim 10, wherein the one or more processors are further configured to receive, from the secondary computing system, authorization to access an application programming interface (API) of the secondary computing system.

12. The system of claim 11, wherein the subset of data records are retrieved using the API of the secondary computing system.

13. The system of claim 10, wherein the one or more processors are further configured to parse the network token received from the client device.

14. The system of claim 10, wherein the one or more processors are further configured to update the user profile based on the subset of data records of the second profile.

15. The system of claim 10, wherein the network token indicates that the subset of data records can be accessed periodically, and wherein the one or more processors are further configured to retrieve the subset of data records from the secondary computing system by periodically retrieving the subset of data records from the secondary computing system.

16. The system of claim 10, wherein the one or more processors are further configured to retrieve the subset of data records from the secondary computing system by performing a single API call using the API of the secondary computing system.

17. The system of claim 16, wherein the single API call comprises one or more parameters identified in the network token.

18. The system of claim 10, wherein the network token comprises an expiration time stamp, and wherein the one or more processors are further configured to provide a prompt to the client application indicating that the network token has expired responsive when a current time exceeds the expiration time stamp.

19. A non-transitory computer-readable medium having computer-executable instructions embodied thereon, the computer-executable instructions, when executed by one or more processors, cause the one or more processors to perform operations comprising:

providing a user interface that lists a plurality of secondary computing systems to a client application corresponding to the one or more processors and executing at a client device associated with a user profile of the one or more processors;

responsive to detecting a selection of a secondary computing system of the plurality of secondary computing systems at the user interface, receiving, from the client device, a network token identifying a permission for accessing a second profile maintained at the secondary computing system;

determining a subset of data records of the second profile that the one or more processors are permitted to access;

parsing the network token to determine an access schedule for accessing the subset of data records of the second profile maintained at the secondary computing system;

retrieving, using the network token, the subset of data records from the secondary computing system according to the access schedule; and updating the user interface at the client application to present the subset of data records of the second profile.

20. The non-transitory computer-readable medium of claim 19, wherein the operations further comprise receiving, from the secondary computing system, authorization to access an application programming interface (API) of the secondary computing system.

* * * * *